United States Patent
Hays et al.

(10) Patent No.: US 10,272,618 B2
(45) Date of Patent: Apr. 30, 2019

(54) FABRICATION OF 3D OBJECTS VIA ELECTROSTATIC POWDER DEPOSITION

(71) Applicant: Xactiv, Inc., Fairport, NY (US)

(72) Inventors: Dan A. Hays, Venice, FL (US); James Mason, Victor, NY (US); Peter J. Mason, Webster, NY (US); Robert Edward Zeman, Webster, NY (US); David Jackson, Rochester, NY (US)

(73) Assignee: Xactiv, Inc., Fairport, NY (US)

( * ) Notice: Subject to any disclaimer, the term of this patent is extended or adjusted under 35 U.S.C. 154(b) by 449 days.

(21) Appl. No.: 15/050,729

(22) Filed: Feb. 23, 2016

(65) Prior Publication Data
US 2016/0243764 A1    Aug. 25, 2016

Related U.S. Application Data

(60) Provisional application No. 62/119,518, filed on Feb. 23, 2015.

(51) Int. Cl.
*B29C 64/141*    (2017.01)
*B29C 64/153*    (2017.01)
(Continued)

(52) U.S. Cl.
CPC ........ *B29C 67/0074* (2013.01); *B29C 64/141* (2017.08); *B29C 64/153* (2017.08);
(Continued)

(58) Field of Classification Search
CPC ... B29C 64/141; B29C 64/153; B29C 64/165; B29C 64/188; B29C 64/194;
(Continued)

(56) References Cited

U.S. PATENT DOCUMENTS 6,066,285 A * 5/2000 Kumar ............... G03G 15/224
    264/317
6,158,346 A * 12/2000 Zhang ................. B29C 64/153
    101/489

(Continued)

OTHER PUBLICATIONS

Office Action dated Mar. 6, 2018 in commonly owned U.S. Appl. No. 14/994,180. EFS File name 20180516_15-050729_IDS_NPL_Cite1.

(Continued)

*Primary Examiner* — Michael A Tolin
(74) *Attorney, Agent, or Firm* — John M. Hammond; Patent Innovations LLC

(57) ABSTRACT

A method of fabricating an object, comprising depositing a first layer of first object material on a support substrate electrode; applying a conductive agent material onto the first layer; depositing a first layer of charged powder on an intermediate substrate; conveying the first layer of charged powder on the intermediate substrate proximate to the first layer of first object material; and applying a transferring electric field to cause transfer of the first layer of charged powder from the intermediate substrate onto the first layer on the support substrate electrode, to form a first powder layer on the first layer on the support substrate electrode. Multiple powder layers may be deposited on the first layer. The method may be further comprised of fusing the powder layer(s) to form a first fused layer on the support substrate electrode. A related object fabrication apparatus is also disclosed.

21 Claims, 15 Drawing Sheets

(51) Int. Cl.
- *B29C 64/165* (2017.01)
- *B29C 64/194* (2017.01)
- *B33Y 10/00* (2015.01)
- *B33Y 30/00* (2015.01)
- *B29C 67/00* (2017.01)
- *B33Y 80/00* (2015.01)
- *G03G 15/22* (2006.01)

(52) U.S. Cl.
CPC .......... *B29C 64/165* (2017.08); *B29C 64/194* (2017.08); *B33Y 10/00* (2014.12); *B33Y 30/00* (2014.12); *B33Y 80/00* (2014.12); *G03G 15/224* (2013.01)

(58) Field of Classification Search
CPC ............ B29C 67/0074; B29C 67/0077; B29C 67/0081; B33Y 10/00; B33Y 30/00; G03G 15/224; G03G 15/225
See application file for complete search history.

(56) References Cited

U.S. PATENT DOCUMENTS

| | | | |
|---|---|---|---|
| 7,261,542 | B2 | 8/2007 | Hickerson et al. |
| 2013/0075022 | A1 | 3/2013 | Chillscyzn et al. |
| 2013/0077996 | A1 | 3/2013 | Hanson et al. |
| 2014/0167326 | A1* | 6/2014 | Jones .................. G03G 15/1645 264/427 |
| 2015/0024317 | A1 | 1/2015 | Orrock et al. |
| 2015/0174695 | A1* | 6/2015 | Elfstroem .......... B23K 15/0086 219/121.14 |
| 2015/0266241 | A1 | 9/2015 | Batchelder |
| 2017/0192377 | A1 | 7/2017 | Batchelder et al. |

OTHER PUBLICATIONS

Commonly owned U.S. Appl. No. 14/994,178 specification, drawings, and Filing Receipt, filed Jan. 13, 2016. EFS file name 20160427_15-050729_IDS_NPL_Cite1.pdf.

Commonly owned U.S. Appl. No. 14/994,180 specification, drawings, and Filing receipt, filed Jan. 13, 2016. EFS file name 20160427_15-050729_IDS_NPL_Cite2.pdf.

\* cited by examiner

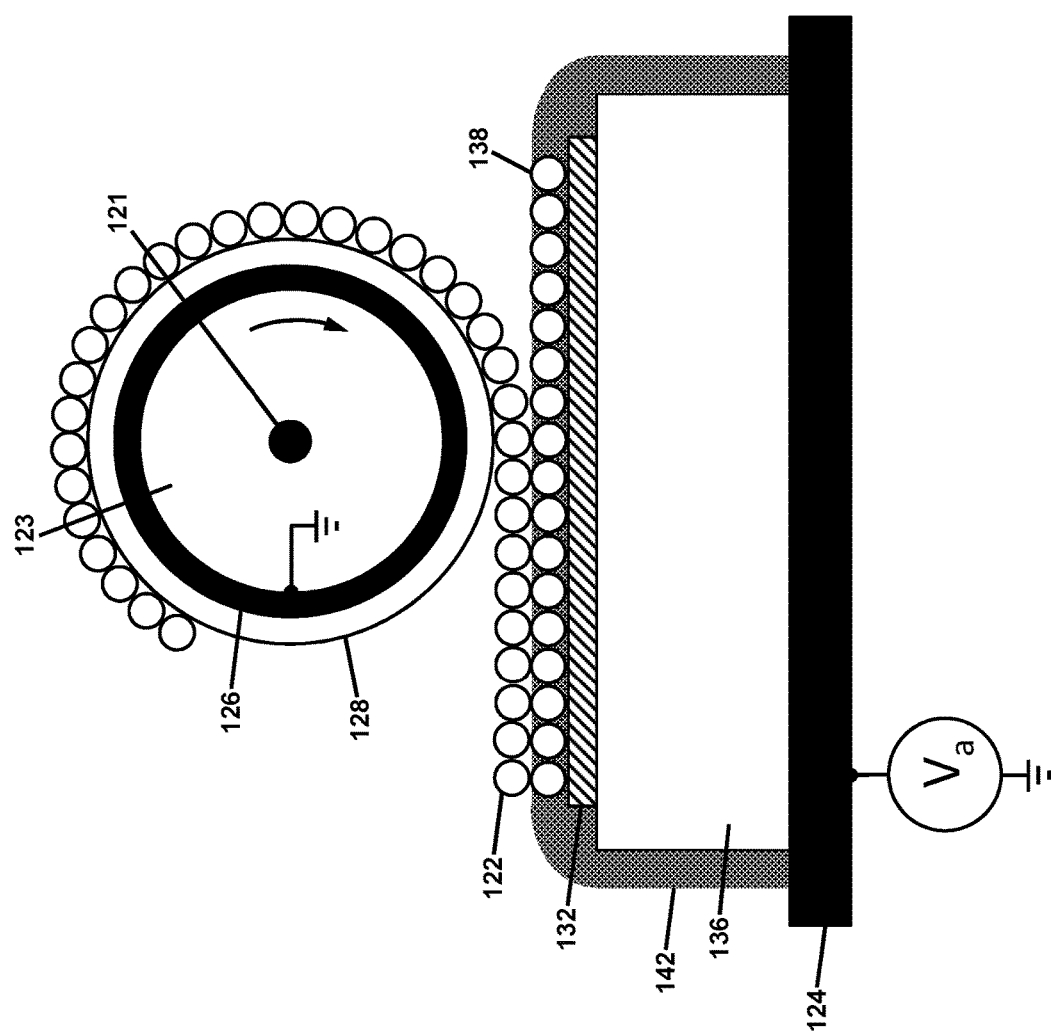

FABRICATION OF 3D OBJECTS VIA ELECTROSTATIC POWDER DEPOSITION

CROSS-REFERENCE TO RELATED PATENT APPLICATIONS

This application claims priority from U.S. Provisional Patent Application No. 62/119,518 filed Feb. 23, 2015, the disclosure of which is incorporated herein by reference.

This application is related to commonly owned U.S. Provisional Patent Application Nos. 62/103,269 and 62/103,476, both filed on Jan. 14, 2015; and copending U.S. patent application Ser. Nos. 14/994,178 and 14/994,180, both filed on Jan. 13, 2016, the disclosures of which are incorporated herein by reference.

BACKGROUND

Technical Field

Devices for and methods of fabrication of three-dimensional objects from powder starting materials.

Description of Related Art

This disclosure relates to a process and apparatus for more efficiently manufacturing three-dimensional (3D) objects from powder materials using a digital fabrication method. The 3D manufacturing process, also known as additive manufacturing, rapid prototyping or solid free form, uses digital files that describe cross sections for building the desired part(s) and support structure(s). Various 3D manufacturing methods have been proposed for digitally fabricating a uniquely shaped object on a build platform. The build rate of digitally produced 3D objects as currently practiced is inherently slow since 1) each 2D layer is typically formed by a two dimensional scanning device and 2) many 2D layers (up to thousands in a high resolution part) are required to produce an object. Furthermore, some manufacturing methods require additional time to post-process a layer before deposition of the next layer. Regardless of the method for building the 3D object, there is a general need to implement process improvements for reducing the time to build uniquely shaped 3D objects.

Various additive manufacturing systems have been proposed to produce three-dimensional objects by either selectively depositing, binding or polymerizing raw materials together in layers. The various alternative methods include filament extrusion techniques, ink jetting, selective laser sintering, powder/binder jetting, electron beam melting, and stereolithographic processes. In general, the various methods tend to exhibit a slow build rate. For example, many of the selective deposition methods have a slow build rate since the deposition of the build and support materials is generally provided by a scanning head for extruding or jetting the material for each layer.

3D manufacturing methods based on electrophotography have been proposed. Although it is recognized that the electrophotographic process can enable formation of 2D layers, researchers have reported problems when attempting to produce arbitrarily thick 3D objects when using conventional electrophotography to produce charged powder depositions that are repeatedly electrostatically transferred and heat fused to the object being built. In one instance, it was found that after about 20 transfers, the object surface had many defects and irregularities that compromised the quality of the object.

In addition to the surface defects problem that arises after many electrostatic transfers of charged powder to build an object, when attempting to build an object using an electrophotographic process, the thickness of the object is self-limited for the conventional electrostatic transfer process. When the electrostatic force for transferring charged powder is provided by an electric field due to an electrical bias applied between the conducting substrate of the build object and the ground plane of the photoconductor, the electric field and correspondingly the applied electrostatic force decreases with increasing thickness of the object. Furthermore, the accumulation of charge on the object due to the charge on the transferred powder creates an electric field that suppresses powder transfer and therefore limits the thickness of the build object and causes irregularities in the surface.

In summary, in currently practiced methods for digitally fabricating 3D objects, the rate for producing 3D objects with such methods is undesirably slow. Accordingly, there remains a need for a high build rate method and apparatus, which can build a three-dimensional part that is free of defects.

SUMMARY

It is the purpose of this disclosure to describe a new process, apparatus, and materials for the additive manufacturing of a 3D object and support material via an electrophotography method that utilizes electrostatic transfer of non-conductive, triboelectric charged powder to an intermediate charge-relaxable roll or belt, which powder in turn is electrostatically transferred to a 3D part and support structure that has been rendered sufficiently conducting either temporarily or permanently. The time constant of the overcoating on the charge relaxable roll or belt is chosen to provide a low to high transfer electric field across the transfer zone.

The process for rendering the 3D object and support material sufficiently conducting for efficient electrostatic transfer of the powder to the 3D object is a separate post electrostatic transfer step. The post electrostatic transfer step may also include methods for providing heat and/or pressure for consolidating or fusing the powder layer to the 3D object and support layer, as well as a conditioning step for maintaining a smooth surface. The separation of the electrostatic powder transfer step from the conditioning step enables higher build rates since the requirements for heating and cooling of the materials during a post transfer step are different. The electrostatic transfer of triboelectric charged, non-conductive powder to the 3D object and support is enabled by rendering the 3D object and support material sufficiently conductive so that an electrical bias can be provided between the surface of the 3D object including support material and a biased roller behind an intermediate charge-relaxable belt medium that is coated with a triboelectrically charged, non-conductive powder layer. The electric field due to the applied electrical bias is independent of the thickness of the 3D object and support material. The electrical bias of the roller is of the same polarity as that of the charged powder.

Since non-conductive powder is used to build the 3D object and support, the conversion of the 3D part/support to a conductive material can be either temporary or permanent. If it is desired that the 3D object be electrically non-conductive upon the completion of the 3D object fabrication, then a temporary or transient conductivity can be imparted to the 3D object during the build process. Examples of temporary conductive agents include various liquids such as alcohols or water with surfactants. On the other hand, if it is desired that the 3D object is to be electrically conducting upon completion of the additive manufacturing, then permanently increased levels of conductivity can be imparted to the 3D object during the layer deposition process. Examples of materials that can increase conductivity include fine conductive particles such as conductive polymers, carbon black, graphite, graphene, graphene nanoplatelets, carbon nanowires, or carbon nanotubes, fluorine-doped tin oxide and sublimable materials such as indium tin oxide, etc. Depending on the conductivity of the permanent conductive agent, the electrical properties of the 3D object can be tailored to span a range from charge-relaxable to conductive.

More particularly, in accordance with the present disclosure, there is provided a method for fabricating an object. The method is comprised of depositing a first layer of first object material on a support substrate electrode; applying a conductive agent material onto the first layer on the support substrate electrode; depositing a first layer of charged powder on an intermediate substrate; conveying the first layer of charged powder on the intermediate substrate proximate to the first layer of first object material on the support substrate electrode; and applying a transferring electric field to cause transfer of the first layer of charged powder from the intermediate substrate onto the first layer on the support substrate electrode, to form a first powder layer on the first layer on the support substrate electrode. The method may be further comprised of fusing the first powder layer on the support substrate electrode to form a first fused layer on the support substrate electrode. In certain embodiments, the first layer may be removably adhered to the support substrate electrode.

In certain embodiments, the conductive agent is in electrical contact with the support substrate electrode. In certain embodiments, the first layer is comprised of a top surface and a side wall, and applying the conductive agent material onto the first layer on the support substrate electrode is comprised of applying the conductive agent material onto the top surface of the first layer, and onto at least a portion of the side wall of the first layer to cause the conductive agent material on the top surface of the first layer to be in electrical contact with the support substrate electrode.

The method may be further comprised of depositing a second layer of charged powder on the intermediate substrate; applying the conductive agent material onto the first fused layer on the support substrate electrode; conveying the second layer of charged powder on the intermediate substrate proximate to the first fused layer of object material on the support substrate electrode; applying the transferring electric field to cause transfer of the second layer of charged powder from the intermediate substrate onto the first fused layer on the support substrate electrode to form a second powder layer on the first fused layer on the support substrate electrode, and fusing the second powder layer on the first fused layer. Alternatively, the method may be further comprised of depositing a second layer of charged powder on the intermediate substrate, conveying the second layer of charged powder on the intermediate substrate proximate to the first powder layer on the first layer on the support substrate electrode; applying the transferring electric field to cause transfer of the second layer of charged powder from the intermediate substrate onto the first powder layer on the first layer on the support substrate electrode, and optionally, fusing the first and second powder layers to form a first fused layer on the support substrate electrode. In embodiments in which the object is comprised of N powder layers fused into a first fused layer, the method may further comprise repeating N–2 times the steps of depositing an additional layer of charged powder on the intermediate substrate, conveying the additional layer of charged powder on the intermediate substrate proximate to the preceding powder layer on the support substrate electrode; applying the transferring electric field to cause transfer of the additional layer of charged powder from the intermediate substrate onto the preceding powder layer on the support substrate electrode; and fusing the N powder layers fused into the first fused layer.

In certain embodiments, the conductive agent may be a liquid. In some embodiments, the liquid may be a liquid polymer solution. In other embodiments, the liquid may be a polar protic solvent selected from the group consisting of water, alcohols having a molecular weight of less than 61, and mixtures thereof. The liquid conductive agent may further include a surfactant. In other embodiments, the conductive agent may be a solid material, such as graphene nanoplatelets. The conductive agent may be temporarily present on the first layer.

In certain embodiments, the first layer of first object material may be formed by depositing a base layer of charged powder on an intermediate substrate, conveying the base layer of charged powder on the intermediate substrate proximate to the support substrate electrode; applying a base electric field to cause transfer of the base layer of charged powder from the intermediate substrate onto the support substrate electrode, and fusing the base layer on the support substrate electrode.

In accordance with the present disclosure, there is also provided an apparatus for fabricating an object. The apparatus is comprised of a charged powder transferring member comprising an electrically charge-relaxable member coupled to a transfer drive system operable to move the powder transferring member in cyclic motion; a charged powder layer generating device disposed proximate to the powder transferring member and operable to dispense a layer of charged powder upon a powder transferring surface of the powder transferring member; an object build platform comprising a conductive support substrate surface and coupled to a platform drive system operable to move the conductive support substrate surface in synchronous motion with the cyclic motion of the powder transferring surface of the powder transferring member; and a post-transfer station comprising a conductive material dispenser, the post-transfer station capable of relative motion with respect to the object build platform to enable the conductive material dispenser to dispense conductive material upon at least one of the conductive support substrate surface and a surface of a powder layer of the object disposed on the conductive support substrate surface.

In certain embodiments, the apparatus may be further comprised of a powder layer consolidation station operable to fuse object powder layers disposed on the object build platform. In certain embodiments, the charged powder transferring member may be a belt comprising an electrically charge-relaxable material, with the apparatus further comprised of at least one electrically conductive roller in contact with an internal surface of the belt in regions for transferring charged powder to and from the powder transferring member. The at least one electrically conductive roller may be movable in synchronous motion with the support substrate surface of the object build platform. In other embodiments, the charged powder transferring member is a cylindrical drum comprising a cylindrical conductive substrate overcoated with a charge-relaxable material. The surface of the powder coated cylindrical drum with a charge-relaxable overcoating is rotated to cause synchronous motion of both the charged powder transferring member and support substrate surface of the object build platform.

In certain embodiments, the post-transfer station may be comprised of a first conductive material applicator directable to at least one of the support substrate surface of the object build platform and a surface of a powder layer of the object parallel to the support substrate surface, and a second conductive material applicator directable to a side wall surface of the object during formation of the object on the object build platform.

In certain embodiments, the post-transfer station may be comprised of a liquid conductive material dispenser. The liquid conductive material dispenser may include a liquid vessel containing a liquid conductive material such as an alcohol, an aqueous electrolyte solution, or mixtures thereof. The liquid conductive material may be further comprised of a surfactant and/or a binder polymer. The liquid conductive material dispenser may be comprised of at least one ink jet nozzle array traversable over the support substrate surface of the object build platform. In some embodiments, the liquid conductive material dispenser may be comprised of a first ink jet nozzle array directable to at least one of the support substrate surface of the object build platform and a surface of a powder layer of the object parallel to the support substrate surface, and a second ink jet nozzle array directable to a side wall surface of the object during formation of the object on the object build platform.

In certain embodiments, the post-transfer station may be comprised of a solid conductive material dispenser. The solid conductive material dispenser may include a solids holding vessel containing a solid conductive material selected from the group consisting of a conductive polymer, carbon black, graphite, graphene, graphene nanoplatelets, carbon nanowires, carbon nanotubes, fluorine-doped tin oxide, and indium tin oxide, and mixtures thereof. In some embodiments, the solid conductive material dispenser may be comprised of a first solid material applicator directable to at least one of the support substrate surface of the object build platform and a surface of a powder layer of the object parallel to the support substrate surface, and a second solid material applicator directable to a side wall surface of the object during formation of the object on the object build platform.

In certain embodiments, the powder layer generating device may be comprised of an electrophotographic imaging system. In some embodiments, the electrophotographic imaging system is operable to dispense a plurality of powders upon the powder transferring surface of the powder transferring member, including powders of at least three colors (such as cyan, yellow, and magenta), a black powder, a white powder, and a support powder.

In accordance with the present disclosure, there is also provided an object as an article of manufacture. The object may have a wide variety of three-dimensional shapes. The object is comprised of an alternating sequence of layers of object structural material and a layer of electrically conductive material. The layers of object structural materials are formed by repeating the steps of sequentially forming powder layers on a powder transfer member by an electrophotographic imaging process; electrostatically transferring the layers onto a support substrate; fusing the layers to form a portion of the object, and depositing the layer of electrically conductive material onto a top layer of the portion of the object and electrically connected with the conductive support substrate. The object building may be continued with repeating alternating deposition of structural material layers interspersed with a conductive layer.

The electrically conductive material may be a liquid material selected from the group consisting of alcohols, an aqueous electrolyte solution, and mixtures thereof. The electrically conductive material may be further comprised of a surfactant and/or a binder polymer. The electrically conductive material may be a solid material selected from the group consisting of a conductive polymer, carbon black, graphite, graphene, graphene nanoplatelets, carbon nanowires, carbon nanotubes, fluorine-doped tin oxide, and indium tin oxide, and mixtures thereof. The electrically conductive material may be formulated such that the layer of electrically conductive material is temporarily present between layers of object structural materials, and is absent in the object in a finished state.

The layers of object structural materials may be comprised of powders selected from the group consisting of a first primary color powder, a second primary color powder, a third primary color powder, an additional color powder, a black powder, a white powder, and a support powder. The primary colored powders may be yellow, cyan, and magenta powders. The support powder may be removed from the object by application of a solvent, thereby causing at least one of voids or overhangs in the object in a finished state.

BRIEF DESCRIPTION OF THE DRAWINGS

The present disclosure will be provided with reference to the following drawings, in which like numerals refer to like elements, and in which:

FIG. 15 is an illustration of an apparatus for performing direct electrostatic transfer of insulative charged powder to a charged powder layer rendered temporarily conducting by the application of a liquid solution on top of a thick dielectric covering.

Figure 1:
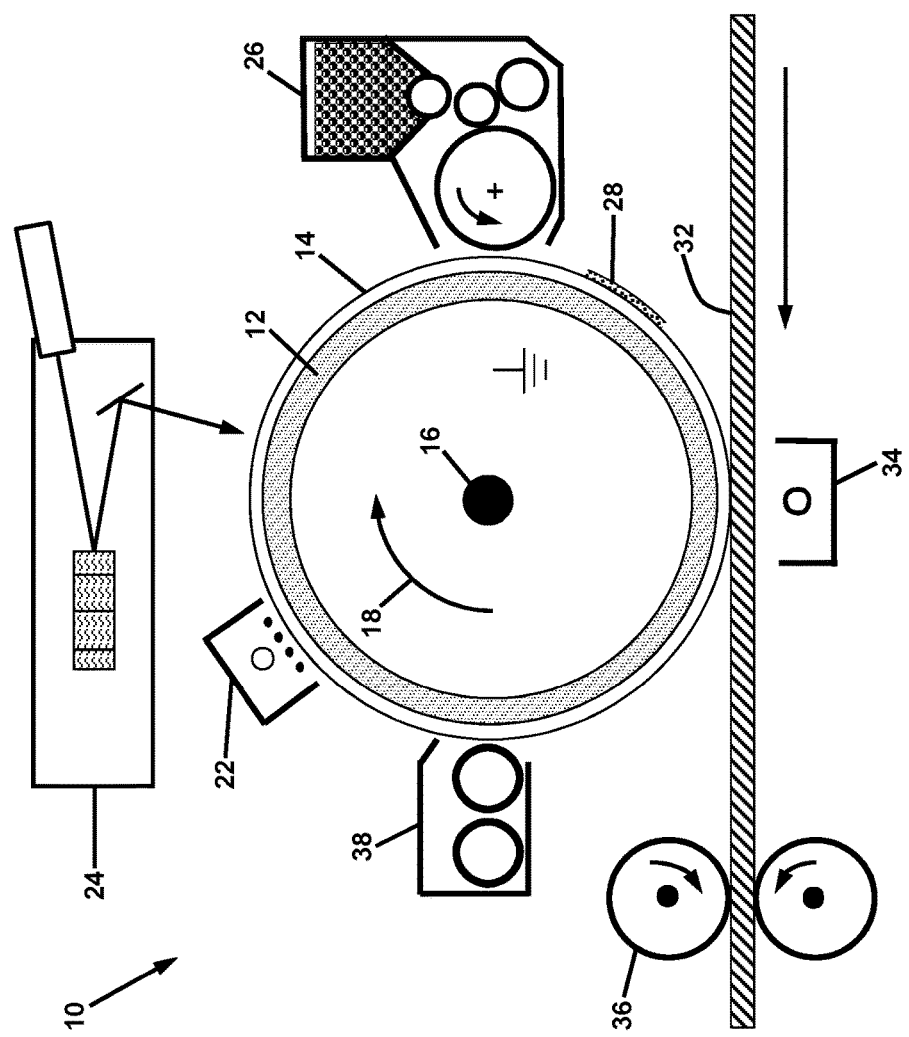
FIG. 1 is a schematic illustration of a conventional electrophotographic printer.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. It is to be understood that the overall scale of the drawings and the relative sizes of particular features are as shown for the sake of clarity of illustration, and may vary from that shown. Additionally, this disclosure may identify certain components with adjectives such as "top," "upper," "bottom," "lower," "left," "right," etc. These adjectives are provided in the context of the orientation of the drawings, which is not to be construed as limiting the apparatus disclosed herein to use in a particular spatial orientation.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

To fully illustrate the practice and benefit of additive manufacturing of a 3D object and support material via an electrophotography method that utilizes electrostatic transfer of charged powder to a 3D object and support structure rendered conducting, a detailed description of certain preferred embodiments is provided. In certain embodiments, the electrophotography method can typically produce 2D powder layers of the size of approximately 21 cm by 28 cm at rates up to approximately 180 layers per minute, which is equivalent to a process speed of about 200 ft/min. This printing rate provides about one powder layer every ⅓ of a second. If each powder layer is approximately 25 microns (μm) thick, a 7.5 cm high 3D object can be fabricated in about an hour at this rate. It should be noted, however, that the intrinsic rate is reduced when building an object on a single platform since periodic post-transfer steps such as fusing the powder layer are required. Assuming the fusing of each powder layer requires about 1 second, the build rate is reduced to about 2.5 cm per hour. Alternative build rates are contemplated. For example, one may refer to the build rates and the analysis thereof as disclosed in commonly owned copending U.S. patent application Ser. No. 14/994,180, the disclosure of which is incorporated herein by reference.

For the purposes of understanding certain electrophotographic embodiments of the apparatus and methods of the present disclosure, a summary of the electrophotographic process will first be presented. Referring to FIG. 1, system 10 is a schematic illustration of a conventional electrophotographic printer for producing black and white prints on a typical medium such as paper. The printer contains a number of sub-systems configured around a rotating grounded and conductive drum 12 overcoated with photoconductive material 14. The shaft 16 is connected to a drive motor (not shown) for rotation of the drum 12 in the direction of the arrow 18. The photoconductive material 14 may be provided from a variety of materials such as amorphous selenium and alloys, zinc oxide either alone or in combination with organic overcoating materials that provide photo-induced charge transport. The photoconductive material 14 is uniformly charged with a corona device 22 and then exposed to light from a laser raster output scanner 24 comprised of a modulated laser beam reflected off of a rotating polygon mirror. Alternatively, a LED image bar may be used to produce an electrostatic latent image on the photoconductor. A development system 26 containing typically insulative powder referred to as toner is charged by triboelectricity in either single component (illustrated in FIG. 1) or two component (mixture of toner with larger magnetic carrier beads) development systems. The triboelectrically charged toner, such as 28, is used to develop either charged or discharged areas of the electrostatic image on the photoconductor; according to the charge polarity of the toner relative to the polarity of the charge on the photoreceptor. A medium 32 such as paper is fed between the toned photoconductor 14 and a corona ion transfer device 34. (The toned region of the photoconductor 14 is the region between approximately the 3 o'clock and the 6 o'clock positions of the photoconductor 14 in FIG. 1.) The polarity of the ion charge applied to the medium 32 by the corona ion transfer device 34 is opposite to that of the toner charge so that the toner 28 is electrostatically attracted to the medium 32. The toned medium passes through a fusing system 36 that binds the toner 28 transferred from the photoconductor 14 to the medium by heat and pressure. Any residual toner (not shown) on the photoconductor that was not transferred to the medium is removed by a cleaning system 38 before repeating the printing cycle.

Efficient electrostatic transfer of toner particles from a photoconductor 14 to a medium 32 requires a high electric field of approximately 40 volts per micrometer (V/μm). When the electric field is provided by a corona ion transfer device 34 as shown in FIG. 1, it is important that the charge not be deposited in the region prior to the transfer zone in which the medium 32 is in close proximity to the toner on the photoconductor. If a high charge density is applied in the region before the transfer zone, ionization of the air in the gap will tend to neutralize the toner charge and consequently reduce the electrostatic force acting on the toner in the transfer zone. This electrostatic force reduction causes poor toner transfer efficiency. Ideally, the ion charge density applied to the medium increases in the zone where the medium is self-spaced from the toned photoconductor. Ideally, the charge density and hence transfer electric field is maximum at the exit to the transfer zone. As the gap between the medium and photoconductor begins to increase in the post-transfer region, the high electric field and consequently high electrostatic force will cause transfer of the toner from the photoconductor to the medium. As the gap continues to increase, it is possible that ionization of the air will occur. However, the toner has already been transferred to the medium so the ion deposition on the toner only causes an increase in its charge. Nevertheless, the transfer efficiency is high under these conditions.

Figure 2:
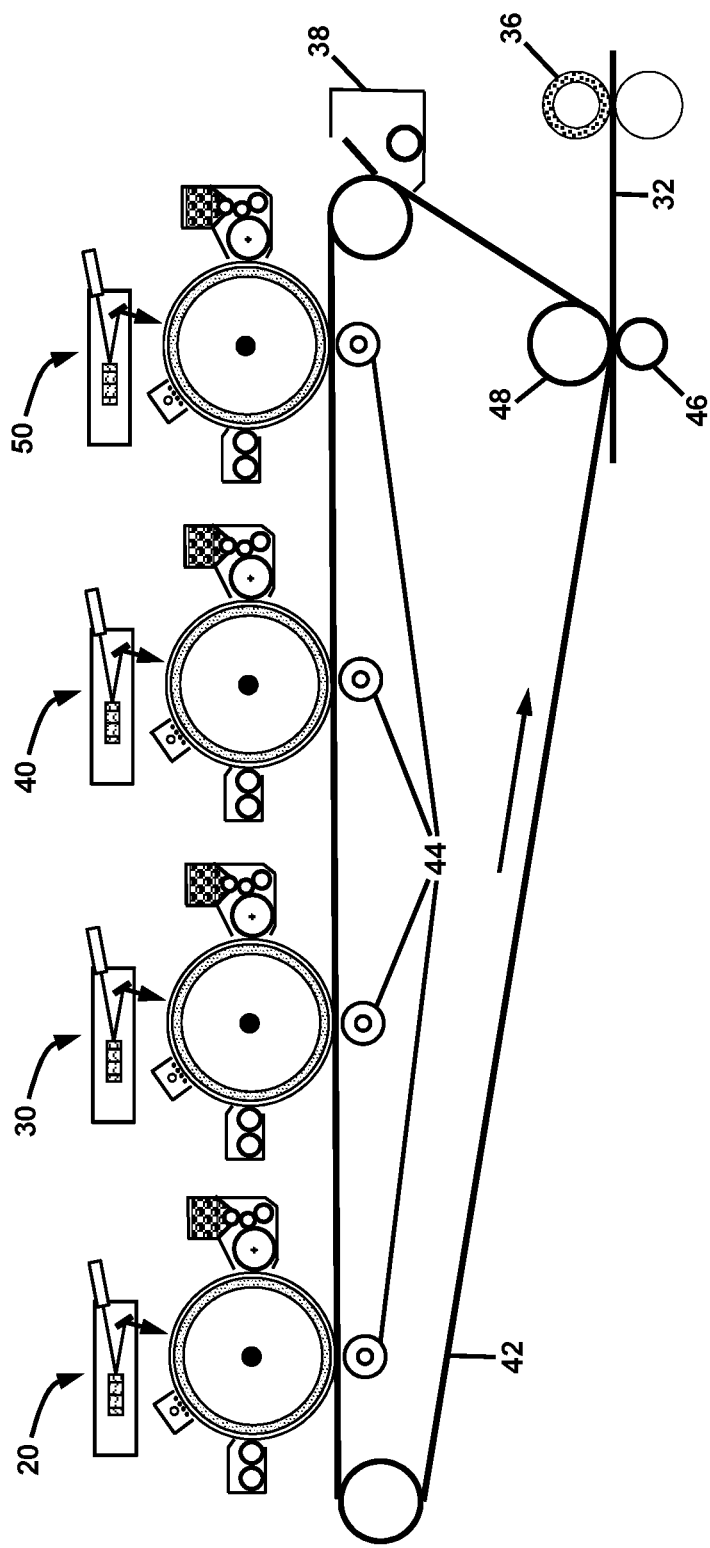
FIG. 2 is a schematic illustration of a full-color electrophotographic printing system with a circulating charge-relaxable intermediate belt that serves as a substrate for assembly of the full-color image before electrostatic transfer to a medium.

For full-color electrophotographic printing systems, multiple imaging systems are required for producing images with cyan, magenta, yellow and black toners. The color separations must be assembled in registration on a substrate. Possible substrates include the print medium, an intermediate charge-relaxable belt or drum, or the photoconductor as practiced in image-on-image full color printing systems. FIG. 2 illustrates a full-color electrophotographic printing system with an endless circulating charge-relaxable intermediate belt 42 that serves as a substrate for assembly of the full-color image before electrostatic transfer to a medium 32. In this architecture, the electrostatic transfer of toner from the different electrophotographic imaging stations 20, 30, 40, and 50 is provided by electrically biased transfer rollers 44. As with the corona ion charging method for providing high transfer electric fields as illustrated in FIG. 1, the electrically biased rollers must be positioned to prevent ionization of the air in the gap before the transfer zone and to provide a high electric field near the exit of the transfer zone. After all of the color toner separations are transferred to the intermediate belt 42, the ensemble is transferred to the medium 32 by a high electric field provided by an electrical bias applied between an electrically biased transfer roller 46 and an electrically grounded backup roller 48. The toned medium passes through a fusing system 36 that binds the toner to the medium 32 by heat and pressure. Any toner on the intermediate belt 42 that was not transferred to the medium 32 is removed by a cleaning system 38 before repeating the printing cycle.

In using an electrical bias on a transfer roller to provide high electric fields for efficient electrostatic transfer of charged powder from both a photoreceptor to an intermediate and an intermediate to a medium, a charge-relaxable intermediate belt or drum is preferred to provide a relatively low electric field in the pre-transfer zone that builds up to a high electric field at the exit of the transfer zone. The time constant for the charge relaxation across the belt thickness is chosen to be comparable to the dwell time of a belt element moving through the transfer zone. In that manner, a high transfer electric field is obtained near the exit of the zones for transferring charged powder to and from the intermediate belt or drum.

Figure 3:
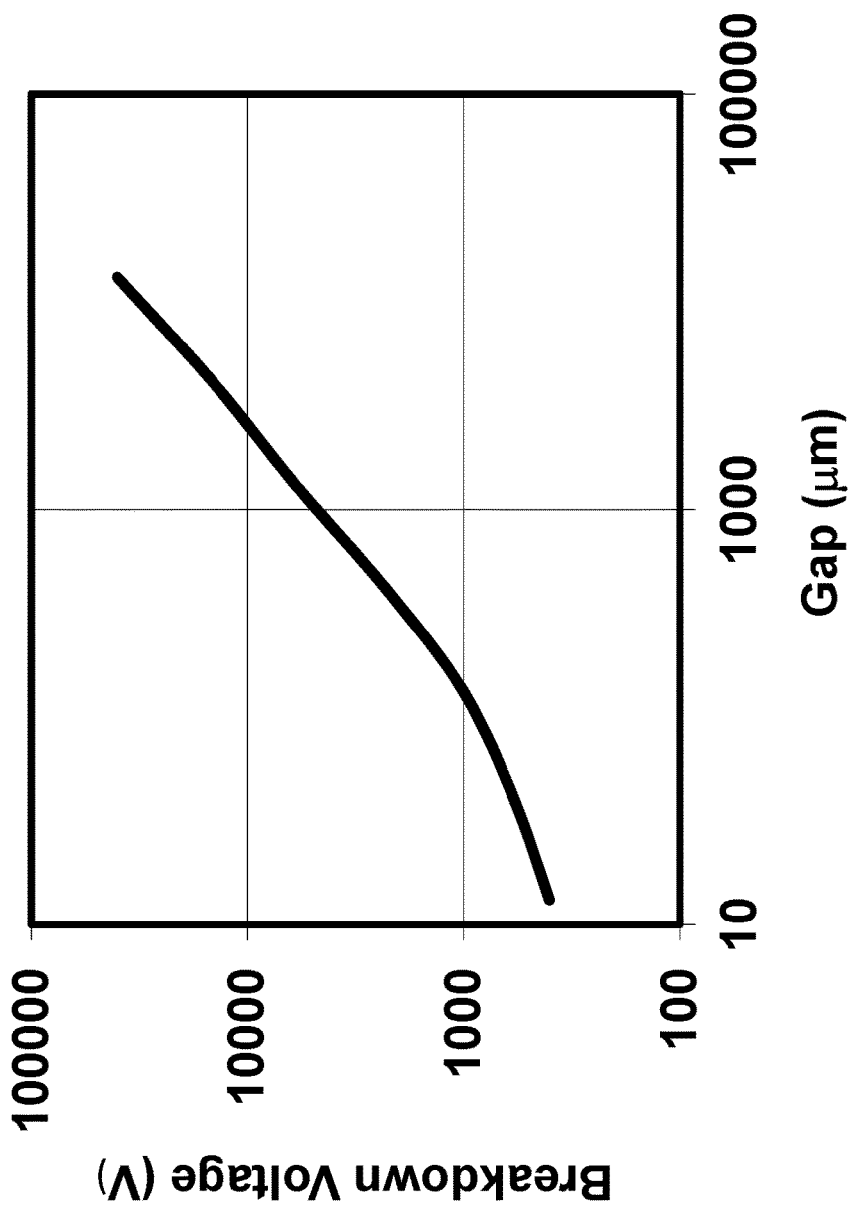
FIG. 3 is the dependence of the Paschen curve for the air breakdown voltage as a function of the gap between parallel electrodes in 1 atmosphere of air pressure.
Figure 4:
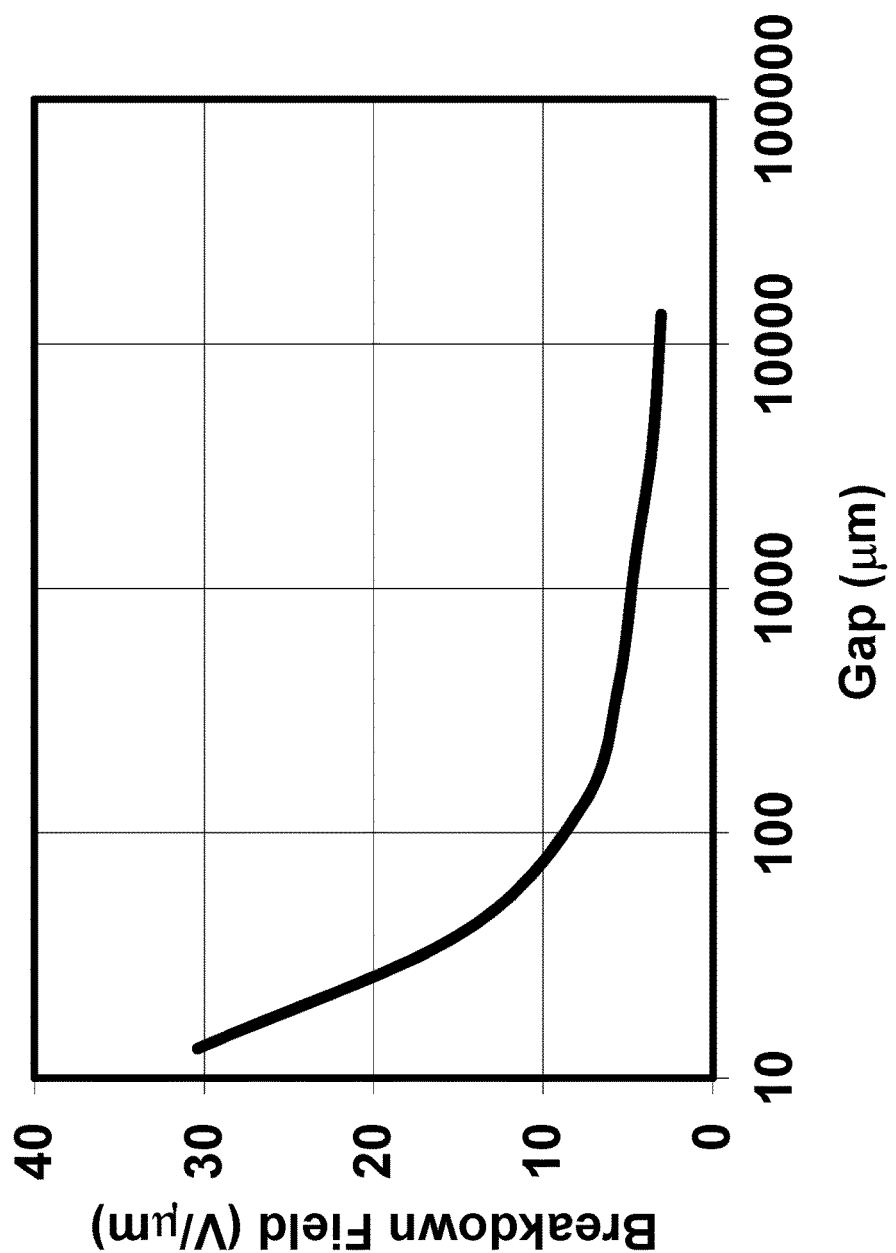
FIG. 4 is the dependence of the Paschen curve for the air breakdown electric field as a function of the gap between parallel electrodes in 1 atmosphere of air pressure.

In applying an electrical bias on a transfer roller to provide high electric fields, there are limitations in the magnitude of the voltage that can be applied to the roller to prevent deleterious air breakdown before or within the transfer zone. To understand these limitations, it is informative to describe the Paschen curves for air breakdown across an air gap formed between parallel electrodes in 1 atmosphere of air pressure. FIGS. 3 and 4 illustrate log-log plots for the breakdown voltage and breakdown electric field as a function of the air gap. The air breakdown voltage increases with increasing gap from a minimum of about 330 V at a gap of 8 µm (not shown) to 30,000 V at a gap of 1 cm. The air breakdown electric field calculated by the ratio of the air breakdown voltage to the air gap decreases with increasing gap. At a gap of approximately 10 µm, the breakdown field is 30 to 40 V/µm. For a gap of 1 cm, the breakdown field is approximately 3 V/µm. Since the electrostatic force acting on a charged particle is proportional to the applied electric field, a high electrostatic force that is not limited by air breakdown can be obtained when the air gap under laboratory conditions is approximately 10 µm or less.

Figure 5:
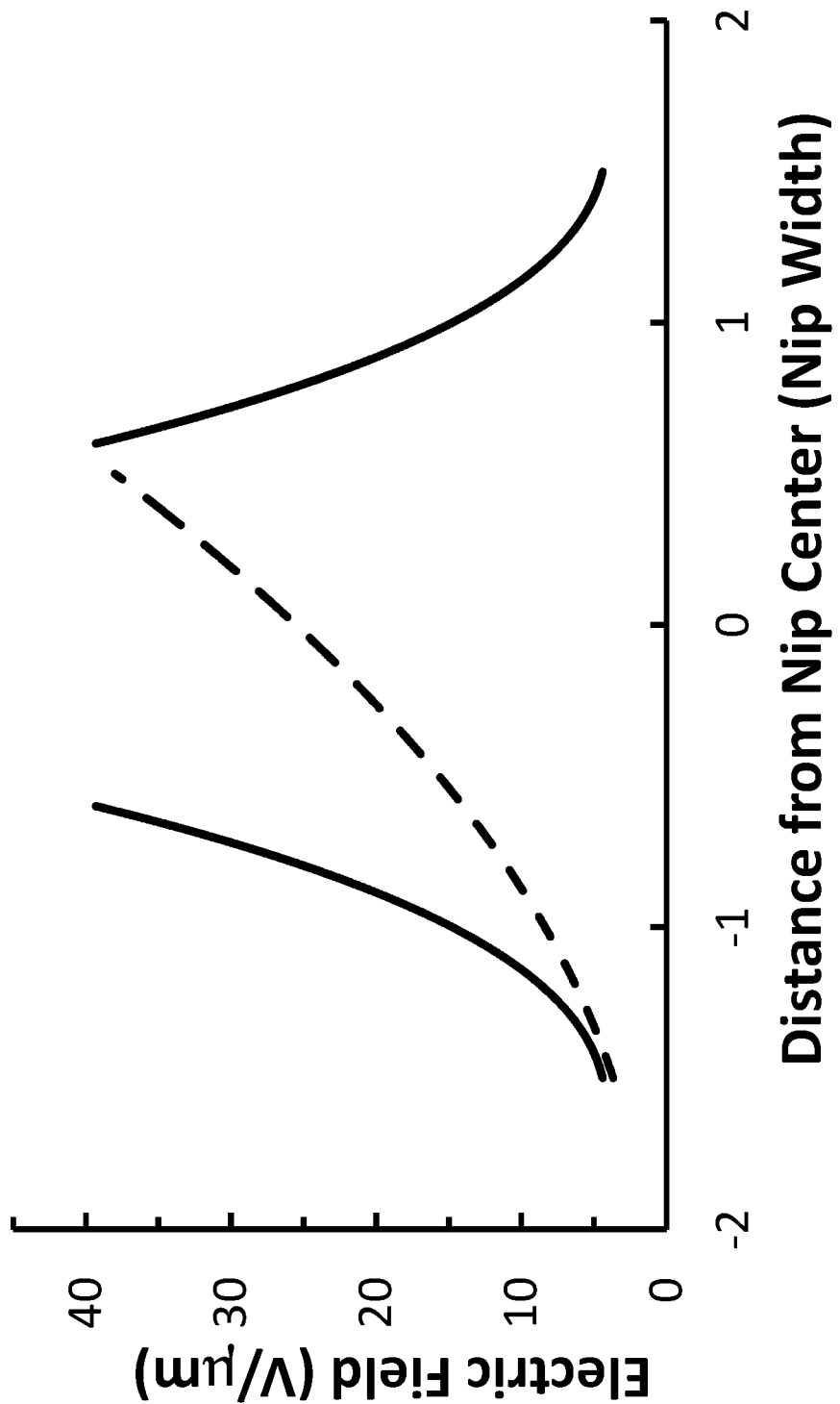
FIG. 5 is an illustration of the electric field profile (dashed line) within as well as before the transfer zone compared to the air breakdown electric field (solid curves) before and after the transfer zone during electrostatic transfer of a powder material to or from a charge-relaxable intermediate belt.

FIG. 5 represents a figure similar to that published by Zaretsky (*J. Imaging Sci. Tech.* 37, 187 (1993)) that illustrates both the transfer and air breakdown electric fields within as well as before and after the transfer zone. In the region before the transfer zone, the electric field in the air gap is relatively low since there is insufficient time for charge to migrate across the charge-relaxable intermediate material. (Much of the potential drop due to the applied voltage is across the intermediate material rather than the air gap.) Since the air gap electric field due to the applied voltage is less than the air breakdown electric field in the region before the transfer zone, there is no air ionization and consequently no toner charge reduction.

Within the transfer zone where the toner is in self-spaced contact with the intermediate material, the transfer electric field continues to increase due to charge migration (electric field collapse) across the intermediate material. The air breakdown electric field is high in this zone since the air gap is small. Outside the region after the transfer zone, the gap begins to increase when the transfer electric field is approximately 40 V/µm. The high electrostatic force acting on the charged toner causes transfer of the toner from the intermediate material to the medium. As the air gap continues to increase, the high post-transfer electric field causes air breakdown and consequently an increase in the charge of the toner on the medium. Efficient toner transfer occurs but the magnitude of the average charge on the toner increases when there is air ionization.

In utilizing electrophotography technology to electrostatically transfer a non-conductive, triboelectric charged powder layer to build a 3D object, the use of the conventional electrostatic transfer method for transferring toner from either a photoconductor or intermediate belt/drum is precluded since the transfer electric field weakens with increasing thickness of the build object. In the case of the intermediate transfer belt, the transfer electric field is provided by applying a voltage between a conductive roller behind the belt and a conductive substrate of the non-conductive 3D object. With increasing thickness of the 3D object, the increased distance between the electrodes causes a decrease in the transfer electric field. To compensate for the decreased electric field with increasing 3D object thickness, one can in principle increase the applied voltage. However, the possibility of air breakdown limits the magnitude of the applied voltage as indicated in FIG. 3. As shown in FIG. 4, the breakdown electric field for air gaps greater than about 1 cm is only about 3 V µm. Since the applied electric field must be less than the breakdown field, the transfer electric field is insufficient for efficient toner transfer.

In utilizing a charge-relaxable intermediate belt to enable enhancement of the transfer electric field within the transfer zone, it is important that the ratio of the thickness of the intermediate material to its dielectric constant (the so called dielectric thickness) be much greater than the sum of the dielectric thicknesses of the powder layer, the donor dielectric substrate (such as a photoconductor) and receiver dielectric thickness (such as paper). As charge migrates across the charge-relaxable intermediate in the transfer zone, the collapse of the electric field within the intermediate increases the electric field acting on the charged powder. For example, if the dielectric thickness of the substrate to which the powder layer is being electrostatically transferred is much greater than the dielectric thickness of the intermediate, the decrease in the electric field within the intermediate will not cause a substantial increase in the electric field acting on the charged powder.

To enable high electric fields for efficient electrostatic transfer of non-conductive, triboelectric charged powder from a charge-relaxable intermediate to a non-conductive 3D object, it is the purpose of this disclosure to describe a new process, apparatus, and materials whereby the 3D object and support structure is rendered sufficiently conducting either temporarily or permanently so that an electrical bias can be provided between the 3D object with support material and a biased roller behind an intermediate charge-relaxable belt medium. Under these circumstances, the electric field due to the applied electrical bias is independent of the thickness of the 3D object with support material. When a 3D object with support material is rendered conducting so that it serves as an electrode, then non-conductive, triboelectric charged powder is directly deposited onto the conductive 3D object. Under these conditions, the dielectric thickness of the powder layer between the intermediate and conductive 3D object is much less than the dielectric thickness of the charge-relaxable intermediate layer. As a consequence, the transfer electric field increases to high values within the transfer zone to provide efficient electrostatic transfer of the non-conductive, triboelectrically charged powder without inducing air breakdown and therefore powder charge reduction in the region near the entrance to the transfer zone.

FIG. 5 illustrates the electric field profile before (<−0.5), within (−0.5 to 0.5) and after (>0.5) the transfer zone in units of 'zone width'. As an element of intermediate material approaches the transfer zone, a decrease in the air gap causes an increase in the transfer electric field (dashed line) that is less than the air breakdown electric field (left solid line). In the region before the transfer zone, there is no air breakdown and therefore modification of the powder charge since the dashed curve is less than the solid air breakdown curve. The increase in the electric field across the charge-relaxable intermediate material causes an increase in the air gap electric field (dashed curve) in the region before as well as within the transfer zone where the powder layer is in contact with the intermediate material. At the exit of the transfer zone, the solid curve on the right of FIG. 5 illustrates that as the air gap increases the threshold for air breakdown decreases. At the moment the air gap begins to increase, the charged powder is transferred due to the high electric field of about 40 V/μm as shown in FIG. 5. As the air gap increases further, the air breakdown causes an increase in the average charge on the transferred powder.

In practicing the 3D object fabrication methods and using the 3D object fabrication apparatus of the present disclosure, the problem of rendering the 3D object and support material sufficiently conducting for efficient electrostatic transfer of the powder to the 3D object is solved using a separate post-electrostatic transfer step. The post-electrostatic transfer step may also include methods for providing heat and/or pressure for consolidating or fusing the powder layer to the 3D object and support layer, as well as a station for maintaining a smooth surface. Since non-conductive powder is used to build the 3D object and support, the conversion of the 3D part/support to conductive material can be either temporary or permanent. If it is desired that the 3D object be electrically non-conductive upon the completion of the additive manufacturing, then a temporary or transient conductivity can be imparted to the 3D object during the build process.

It should be noted that any one post-transfer station for conditioning the 3D object and support material does not necessarily need to be utilized after each electrostatically transferred powder layer. Rather, a number of powder layers can be electrostatically transferred to the 3D object and support material before there is any need to condition such multiple layers. For example, a temporary or permanent conductive material might be applied only after multiple layers are deposited on the 3D object and support material. However, when multiple layers are first electrostatically transferred before applying a temporary or permanent conductive material, it would be beneficial to neutralize each transferred layer of charged powder with an AC corona gaseous ion station that reduces the repulsive electric field from the transferred powder charge. The neutralization of a transferred powder layer prevents a reduction in the electric field for electrostatically transferring the next charged powder layer.

Another example of a conditioning step that does not necessarily need to be carried out after each electrostatically transferred powder layer is the application of heat and/or pressure for consolidating or fusing the powder. In certain embodiments, fusing after transfer of multiple powder layers can enable higher 3D object build rates.

Certain embodiments of the apparatus and methods of the present disclosure for the fabrication of a 3D object will now be described in further detail, with reference in particular to FIGS. 6-15.

Figure 6:
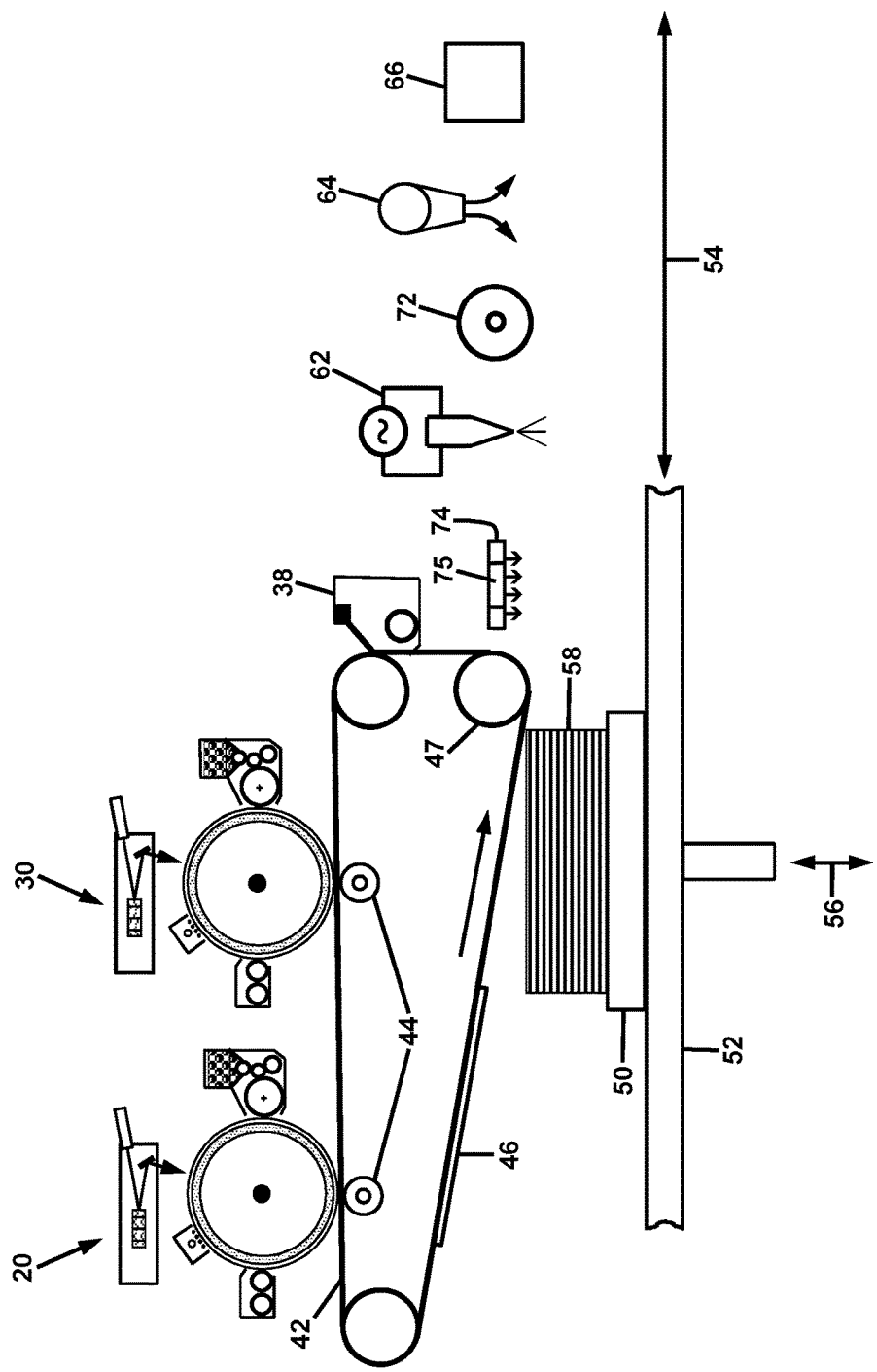
FIG. 6 is a schematic illustration two electrophotographic imaging stations that enable electrostatic transfer of insulative, triboelectric charged powder to a charge-relaxable intermediate belt with subsequent electrostatic transfer to a 3D object rendered conductive and conditioned by post-transfer stations.

Referring first to FIG. 6, two electrophotographic imaging stations 20 and 30 are illustrated, which enable electrostatic transfer of a layer 46 of insulative, triboelectric charged powder to a charge-relaxable intermediate belt 42 with subsequent electrostatic transfer to a translating 3D object 58 rendered conductive by a post-transfer station 74. The powder layer 46 on the intermediate belt 42 is electrostatically transferred to the conductive 3D object 58 by an electrical bias applied between a conductive roller 47 and the translating build object 58 in synchronous contact with the powder layer 46. The 3D object 58 is built on a platform 50 attached to a moving carriage 52 that can be translated back and forth in the process direction 54, as well as the vertical direction 56 through the use of motors and drive apparatus. When multiple layers are first electrostatically transferred before applying the temporary or permanent conductive material via post transfer station 74, each transferred layer of charged powder may be neutralized with an AC corona gaseous ion station 62. FIG. 6 also illustrates the possibility of post-transfer consolidation or fusing of the powder layer(s) on the object 58 by a powder layer consolidation station. Such a station may include a fusing roll 72 for the application of heat and pressure to the powder layer(s), a cooling device 64 and a surface-smoothing device 66. Any residual powder on the intermediate belt 42 is removed by the cleaning system 38 before the next deposition cycle.

Figure 7:
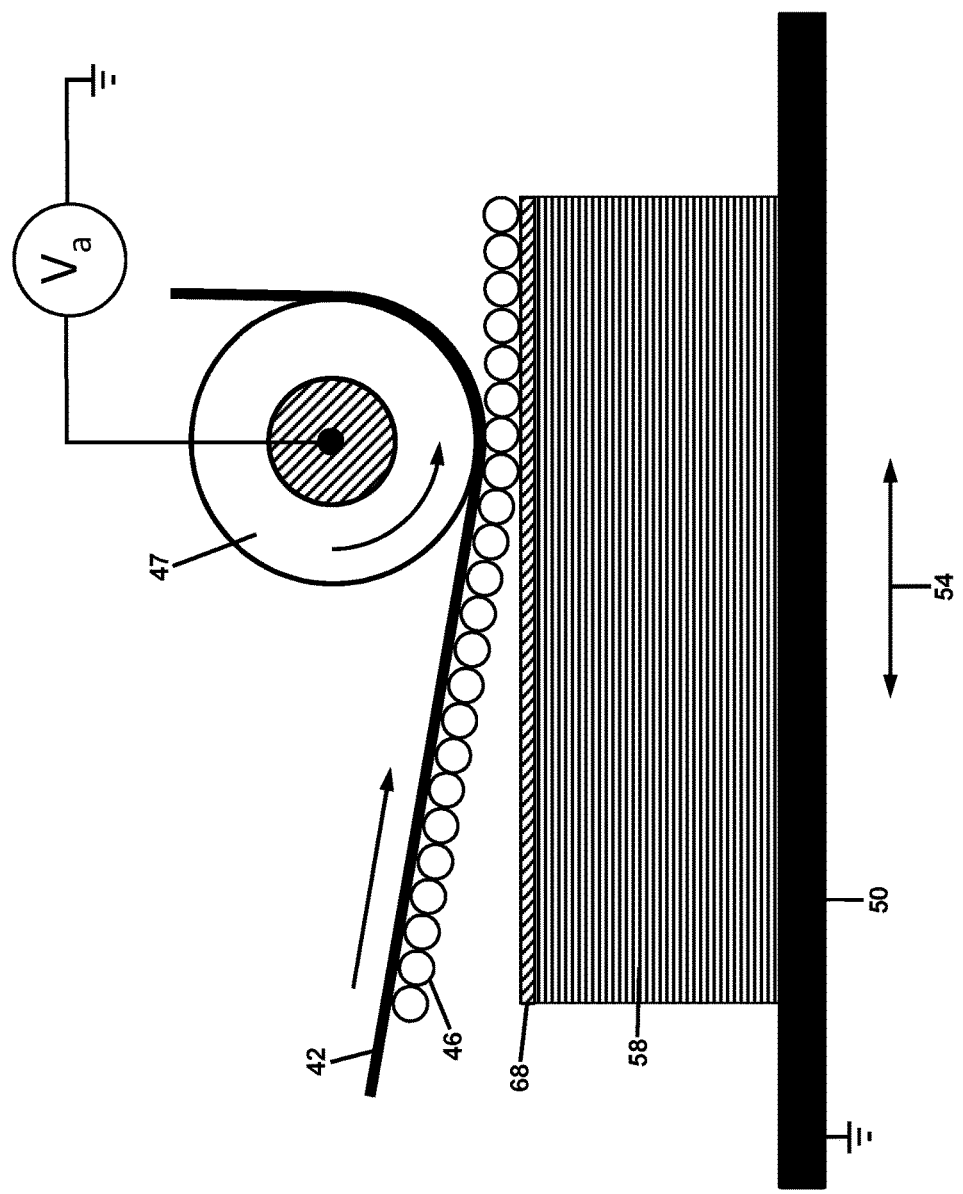
FIG. 7 is an illustration of a more detailed view of the electrostatic transfer of charged powder to a 3D object rendered conductive by a post-transfer station.

FIG. 7 provides a more detailed illustration for the electrostatic transfer of charged powder 46 on a charge-relaxable intermediate belt 42 to a translating 3D object 58 rendered conductive by the application of a temporary or permanent conductive material 68. The conductive material is in contact (not shown) with the grounded substrate 50 that can be translated back and forth in the direction 54. A transfer voltage $V_a$ is applied to the conductive transfer roller 47 to provide the electric field for transfer of the charged powder 46 to the 3D object 58 rendered conducting by the material 68.

It is useful to provide a detailed description of the materials and methods for rendering a 3D object and its support material conductive to enable the application of an electrical bias for repeated efficient electrostatic transfer of insulative, triboelectric charged powder. Examples of temporary conductive agents include various liquids such as alcohols or water with surfactants. In applying such liquids to a powder layer on the surface of the 3D object and support material, the Applicants hypothesize that the liquid must have sufficient electrical conductivity and sufficiently low surface energy so that the liquid can wet the powder layer by capillary forces. (It is noted that in embodiments in which the conductive agent material is a liquid, it is preferable to apply the liquid conductive agent to the powder layer prior to fusing the powder layer, so that the liquid is imbibed into the powder.) In further analyzing the possibility of using a liquid as a conductive agent to render a support substrate for building a 3D object conductive, and/or for rendering a portion of the 3D object on the support substrate conductive, the Applicants further hypothesize that the electrical conductivity of the liquid used to render the surface of a 3D object and support material sufficiently conducting temporarily should be on the order of or greater than $4 \times 10^{-2}$ Siemens per meter (S/m).

Before considering the types of fluids that have sufficient conductivity to render an insulative surface temporarily conducting to enable electrostatic transfer of charged powder, it is further noted that the liquid preferably is able to wet the powder and therefore be imbibed within the void spaces of the powder through the action of capillary forces. The wettability of a powder layer by a liquid depends on a number of factors including the relative surface energies of the powder and liquid. For example, the wettability of a particular powder can be improved with a surface additive. Furthermore, the wettability can be improved through the addition of surfactants in the liquid. In certain embodiments, polar protic solvents, such as water and low molecular weight alcohol, are considered to be suitable liquids.

Water represents one class of liquids that can provide sufficient electrical conductivity and powder wettability through the inclusion of additives. The electrical conductivity of water is highly dependent on the ion concentration of salt additives. For pure water at room temperature, the electrical conductivity of about 5 $\mu$S/m is inadequate for rendering the surface of a 3D object and support material conducting. The presence of an electrolyte is beneficial in increasing the conductivity. For example, drinking (tap) water, containing small concentrations of various dissolved salts, typically has a conductivity of 0.05 S/m, which meets the conductivity requirement. The addition of salt at concentrations comparable to that of sea water increases the electrical conductivity to about 5 S/m; a conductivity much greater than the requirement.

Although a salt solution of water can provide sufficient electrical conductivity, the surface energy of water at 73 mN/m (milli-newton per meter) precludes the wettability of typical powder materials. However, the wettability of powders can be obtained through the addition of surfactants that effectively lower the surface energy of the water.

Alcohols represent another class of liquids that can have sufficient electrical conductivity to satisfy the conductivity requirement for rendering an insulative surface temporarily conducting to enable electrostatic transfer of charged powder. Possible suitable alcohols include methanol, ethanol, propanol and isopropanol.

The use of liquids to render the surface of a 3D object conducting to enable electrostatic transfer of powder layers provides a certain degree of powder cohesion due to capillary forces. However, the cohesion due to the capillary force vanishes if the liquid evaporates, as will particularly be the case when using alcohol versus water based liquids. To provide permanent cohesion of the 3D object and support material, various polymeric materials may be added to the liquid for binding the powder together after the liquid evaporates. For water-based liquids, water-soluble polymers such as polyvinyl acetate can be added to provide a powder binding agent after the water evaporates. This polymer is widely used in wood glues. For alcohol-based liquids, various polymeric materials such as the copolymer polyvinylpyrrolidone and polyvinyl acetate may be used to provide cohesion after the alcohol evaporates. Other examples of polymeric binder materials include acrylates, polydimethylsiloxane, shellac, and gum Arabic.

As another approach for binding powder layers after deposition, the conductive liquid can contain photopolymers for inducing cross-linking upon exposure to a UV light source. It is preferable that the photopolymers have a low shrinkage upon polymerization in order to avoid distortion of the 3D object. Common monomers include multifunctional acrylates in combination with a non-polymeric component. Other polymers include epoxide resins with cationic photoinitiators as well as free-radical and cationic polymerizations comprised of both epoxide and acrylate monomers.

Another method for binding powder layers after deposition is to utilize either a solvent or heat to render the powder or its coating tacky. In the case of solvent exposure, the solvent can be applied via either the conductive fluid or by a separate applicator. If heat is utilized, both heat and pressure can be applied to the transferred layer by post-transfer layer consolidation 72 followed by a cooling step 64 as illustrated in FIG. 6.

FIG. 6 illustrates electrostatic transfer of powder layers to a translating 3D object 58 rendered conductive by a post-transfer station 74. The post transfer station 74 may include a liquid vessel 75 containing a liquid conductive material. For the application of conductive liquids such as alcohols or water with surfactants, a variety of non-contact liquid applicators can be used. Examples of such applicators include 1) humidifiers that typically use ultrasonic transducers to generate liquid droplets, 2) airless spray nozzles that use hydraulic pressure to atomize and spray liquids, 3) ultrasonic nozzles that use piezoelectric transducers in the nozzle tip to generate waves in a liquid film that causes droplets to break off at the surface and 4) various technologies associated with full-width inkjet print heads. Inkjet printing technologies can be broadly classified as being Drop-on-Demand (DOD) or Continuous Ink Jet (CIJ). The DOD technologies are based on the utilization of either thermal or piezoelectric jetting forces. The thermal method that uses a heating element has been widely utilized in the printing industry for aqueous based inks. For non-aqueous ink formulations, piezoelectric transducers enable printing with a wider variety of ink types. For CIJ printing, a continuous stream of droplets is generated by pressure and a piezoelectric transducer. The droplets are charged at the nozzle and deflected by a voltage applied to an electrode to enable droplet deposition on paper. The undeflected droplets are caught in a gutter and returned to an ink supply tank.

The utilization of full-width array inkjet printing technologies is well suited for the non-contact application of conductive liquids to the surface of a 3D object and support material. Such technologies can provide a well-controlled amount of liquid deposition on a surface. Both the DOD and CIJ technologies are capable of printing process speeds up to 1000 ft/min, which is more than sufficient for typical high-speed electrophotographic printing up to process speeds of 200 ft/min.

Although inkjet printing technologies seem to be well-suited for rendering the surface of a 3D object and support material conducting with a conductive liquid, the requirements for the resolution of the deposition can be relaxed. In printing, resolutions up to 600 droplets per inch are often required for high print quality. This requires droplets are the order of 30 µm in diameter. In utilizing inkjet printing technologies to apply a controlled amount of conductive liquid to a 3D object and support material, a larger drop size and lower deposition resolution is sufficient since a uniform deposition over extended areas is typically required. Capillary forces acting on a liquid deposited on a powder surface will cause the liquid to become smoother through liquid spreading.

Figure 8:
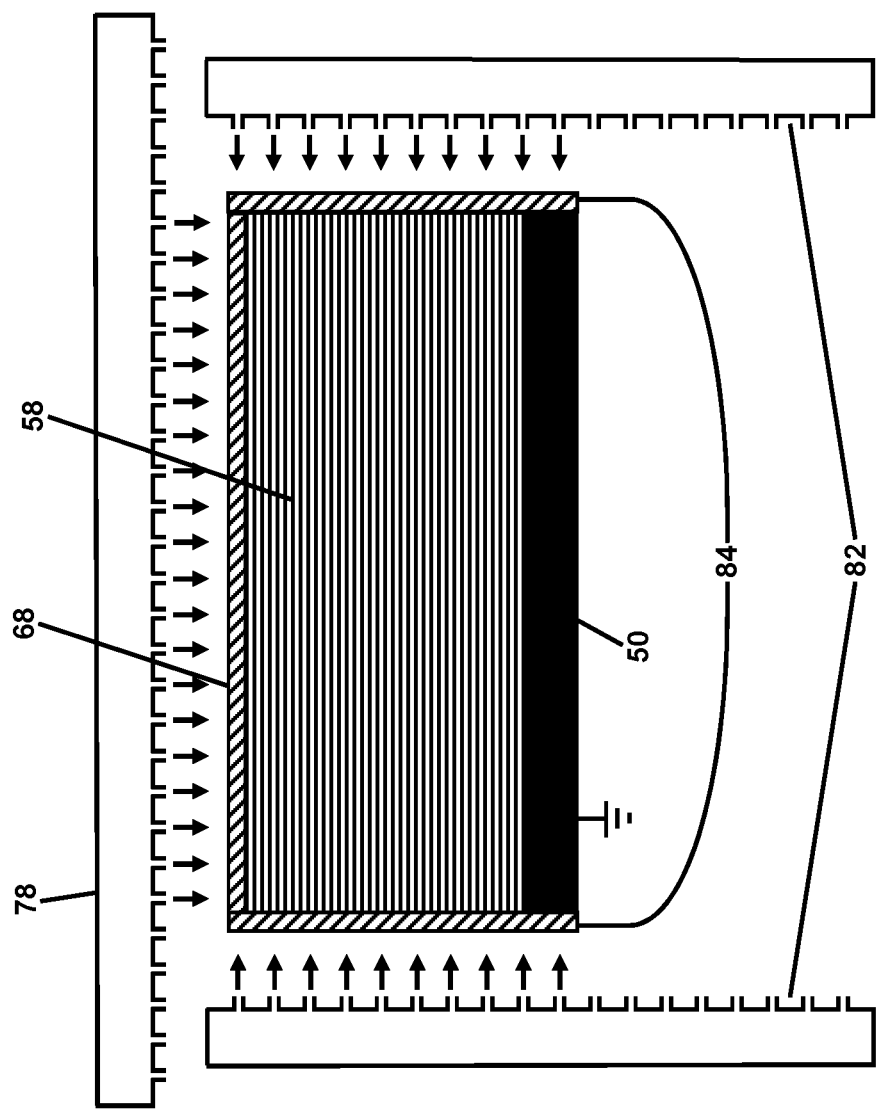
FIG. 8 illustrates a cross-sectional view perpendicular to the process direction that shows horizontal and vertical applicators for applying conductive liquid to the top and sides of a 3D object fabricated in accordance with the present disclosure.

FIG. 7 illustrates a conductive layer 68 that has been deposited onto the 3D object and support material by a conductive liquid applicator 74 as illustrated in FIG. 6. Controlled deposition of the conductive liquid on top of the 3D object and support material can be obtained with one of a number of horizontal oriented applicators based on inkjet printing technologies. Even though an applicator extends beyond the width of the 3D object and support material, the inkjet technologies enable application of the conductive liquid only in desired areas of the 3D object and support material. This is illustrated in FIG. 8 that shows a view in the process direction. The horizontal liquid applicator 78 is shown to deposit conductive liquid 68 in only the area(s) on top of the 3D object and support material 58. To provide electrical contact between the deposited conductive layer 68 and the grounded support 50, a pair of vertical liquid applicators 82 is shown to deposit conductive liquid 84 on those sides of the 3D object and support material in the process direction. As the build thickness of the 3D object and support material increases, more jets of the liquid applicator are energized to ensure coverage of the sides from the top to the grounded support. The composition of the conductive liquid for the sides 84 may differ from the conductive liquid for the top 68 since, for example, the latter might contain binding agents.

Although a single liquid applicator is illustrated in FIG. 8 for the top and each side of the 3D object, it is clear that more than one liquid applicator can be utilized if a greater amount of liquid deposition is desired. Also one might have different liquids, which contain binder for application to object areas and which contain no binder for application to support material areas. The implication from FIG. 8 and this accompanying disclosure is that conductive liquid may be applied to the top and sides of the 3D object after each electrostatic transfer of a charged powder layer from an intermediate belt to the 3D object. Depending on the liquid evaporation rates and the amount of liquid applied by the applicator, it may be sufficient to apply the conductive liquid to a sequence of transferred powder layers, rather than applying it to each individual transferred powder layer.

In apparatus embodiments alternative to those comprising horizontal and vertical ink jet applicators as depicted in FIG. 8, other applicators for applying conductive materials are contemplated. In certain embodiments, a liquid atomization or other dispensing applicator may be used, which is capable of applying conductive liquid as a top layer 68 on the object 58 and as a side layer 84 on the side walls of the object 58. In other embodiments, solid conductive materials as disclosed herein may be applied as top and side layers 68 and 84 using an applicator brush or other suitable means.

Rather than applying a temporary or transient conductive liquid to a 3D object and support material to render it conducting for efficient electric field transfer of charged powder layers, a permanent conductive material in the form of a powder or film of a solid may alternatively be used if it is desired or acceptable that the 3D object is electrically charge-relaxable or conducting upon completion of the manufacturing process. The permanent conductive material may be applied to the 3D object after one or more depositions of powder layers. In certain embodiments in which the conductive agent material is a solid, the solid conductive agent material is preferably applied after fusing the powder layer, so that a relatively smooth and shear-resistant surface is provided for receiving the solid conductive agent material. Application methods may include the use of a roller, brush, magnetic brush, wiper blade and sublimation. In such embodiments, the post transfer station 74 may include a solids holding vessel 75 (FIG. 6) containing the solid conductive material.

Examples of permanent conductive agents that can be applied include fine conductive particles such as conductive polymers, carbon black, graphite, graphene, graphene nano-platelets, carbon nanowires, or carbon nanotubes, fluorine-doped tin oxide and sublimable materials such as indium tin oxide, etc. The effectiveness of fine particles or sublimable materials in being able to render a surface conductive is enhanced when the deposition is made onto a smooth surface such as that produced by subjecting powder layers to a sintering or fusing station. The permanent conductive agent can be applied directly to either the upper surface of the 3D object and support material or the surface of the heated fuser roll as part of the sintering or fusing station.

One such "dry" or solid phase conductive material that is well suited in this application is graphite. This material may be applied to the surface of the 3D object 58 by various means to render the surface conductive. The Applicants have discovered that it is particularly beneficial to apply the conductive layer such as graphite as a very thin layer. In certain embodiments, the layer may be applied at a thickness of 0.75 µm thick, which is much thinner than the average particle diameter of the powder being used, which may be, e.g., acrylonitrile butadiene styrene (ABS) toner. The Applicants believe that in using a sufficiently thin conductive layer, this enables the average ABS particle to penetrate through the graphite layer and contact the previously fused powder layer underneath, thereby enabling, optionally under heat and pressure, interpenetration of the ABS molecules to form a continuous solid structure.

The Applicants have observed that despite the low physical thickness of the graphite layer, its surface resistivity is low enough to make the ABS surface effectively conducting, given the small electrostatic transfer currents involved. It has been discovered that application of a graphite later to achieve sheet resistance of $10^3$-$10^5$ ohms/square produces superior results. By neutralizing toner charge build-up with an AC corona after each transfer, seven layers of toner have been successfully electrostatically transferred upon one another sequentially before fusing the entire stack and re-applying the conductive graphite layer. Transfer efficiency was observed to be very high and unchanged throughout the seven transfers.

In the fabrication of 3D objects, such a capability will greatly speed part production, given well-established high speed xerographic transfer rates. Additionally, with seven or more layers of toner thickness per graphite/conductive agent application, the thickness ratio of toner to graphite approaches about 100:1, greatly reducing any impact of the agent on the mechanical integrity of the finished part. The Applicants have also discovered that the degree of surface conductivity imparted can be controlled by the amount of graphite applied and the pressure used in its application. Thus, one could systematically alter the conductivity throughout the build, if required, to achieve the appropriate conductivity for the process/materials used; the sheet resistance range may be from $10^1$ to $10^7$ ohms/square. Advantageously, the use of a dry conductive agent such as graphite avoids having liquids present in a fabrication machine in which high voltages are present. Additionally, in a method of fabrication a 3D object that includes the use of a dry conductive agent such as graphite, the efficacy of the method is independent of part thickness and bulk resistivity.

Figure 9:
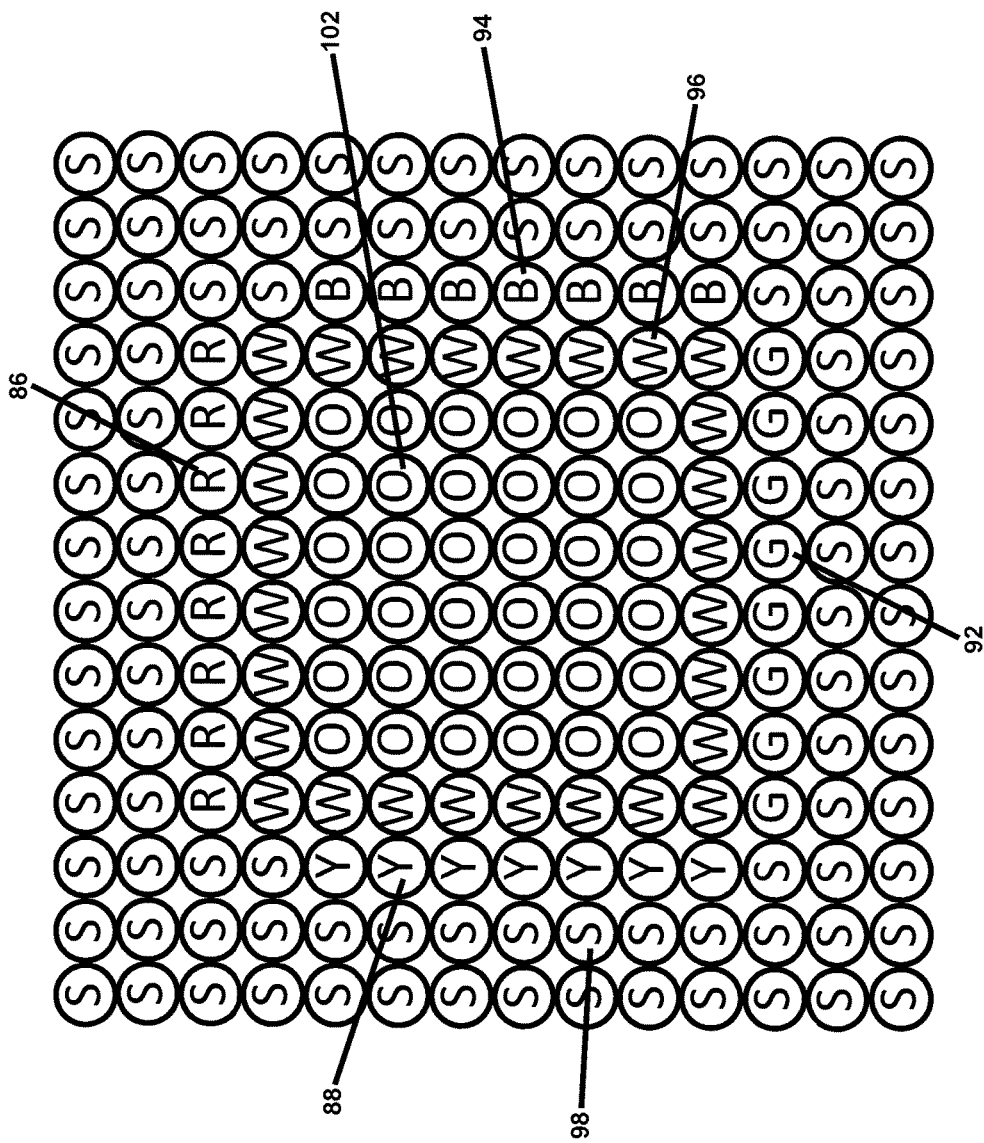
FIG. 9 is a schematic illustration of a horizontal cross-section of a 3D object in which the surface layer of the object is colored and the adjacent surface underlayer is formed with a white powder.

The use of electrophotography for fabricating 3D objects enables the formation of selectively colored objects on demand. This capability for producing selectively colored 3D objects by electrophotography has been discussed in a publication on "An Investigation of Selective Coloring with 3-D Laser Printing" by D. Cormier, J. Taylor and H. West in the *J. Manufacturing Processes*, Vol. 4/No. 2, (2002), pp. 148-152. It was found that the luminescence of a color decreases with increasing number of powder layers. But if a color powder layer is deposited on multiple layers of a white powder, the luminescence remains high. FIG. 9 illustrates an example of one layer of a 3D object in which the sides of a square cross-section of a 3D object have the color of red 86, yellow 88, green 92 and blue 94 surrounded by a support powder layer 98. A white powder 96 is deposited inside and adjacent to the colored powder to provide high luminescence when the surrounding support material 98 is removed. The core of the object can be formed from either white powder or other object powder 102 as illustrated in FIG. 9. To produce 3D objects with a full-color surface and an underlayer of white powder, a total of seven electrophotographic imaging stations is required for depositing powders of cyan, magenta, yellow, black, white, support and object. However, it is noted that the fabrication of colored 3D objects as disclosed by Cormier et al. having substantial thicknesses still suffers from the problem of slow throughput as described previously herein.

The insulative powder used in electrophotography can be triboelectrically charged in a single component development system as illustrated in FIG. 1 as 26 or two-component (mixture of powder with larger magnetic carrier beads) magnetic brush development systems. Single component development systems are typically used in home or small office electrophotographic printers due to their relatively small size and low print speed and volume. For office and production electrophotographic printers, a two-component magnetic brush development system enables high-speed printing at large print volumes. It is for this reason that magnetic brush development systems are particularly preferred for use in electrophotographic 3D printing systems.

One preferred magnetic brush development system for powder charging and transport to a deposition zone utilizes a mixture of the deposition powder and permanently magnetized carrier beads as disclosed in U.S. Pat. No. 4,546,060, the disclosure of which is incorporated herein by reference. The magnetic carrier particles comprise a magnetic material exhibiting hard magnetic properties as characterized by a coercivity of at least 300 gauss and exhibit an induced magnetic moment of at least 20 emu/g when in an applied field of 1000 gauss.

Figure 10:
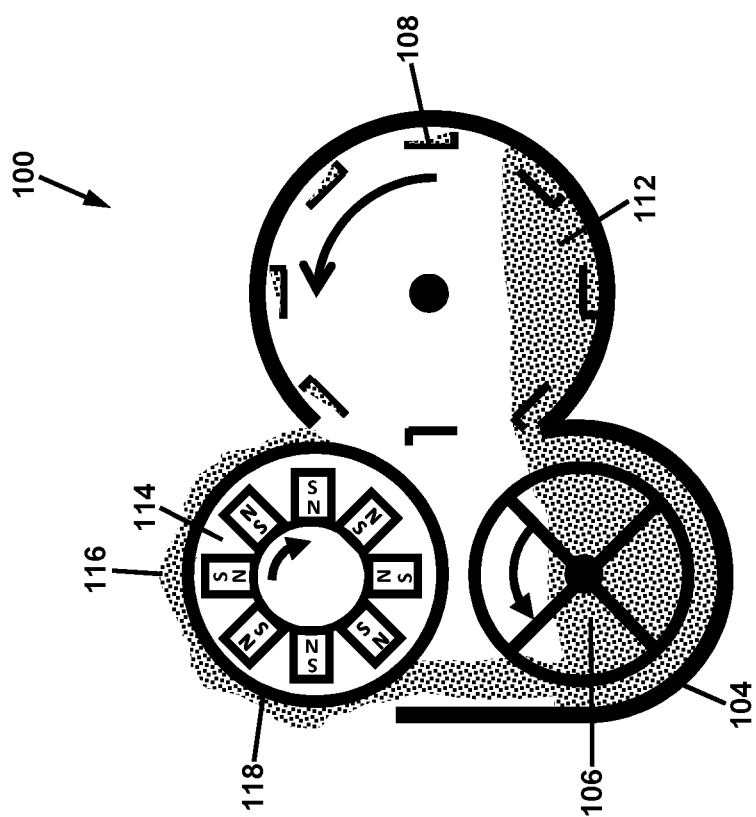
FIG. 10 is an illustration of a two-component magnetic brush development system with mixture of powder and permanently magnetized beads.

FIG. 10 is a schematic illustration of such a magnetic brush development system 100 comprised of a sump 104, a cross mixer 106, a paddle wheel elevator 108, two-component developer material 112 and a magnetic brush roll assembly 114. The system 100 is configured to provide developer transport 116 for the deposition of charged powder on a photoreceptor 118 according to an electrostatic pattern. In the operation of system 100, the cross mixer 104 is rotated in the sump 104, which contains the mixture 112 of deposition powder and permanently magnetized carrier beads. The rotation of the cross mixer 106 in the mixture 112 provides mechanical energy to the mixture 112 for the purpose of triboelectrically charging the insulative powder. The cross mixer 106 furthermore moves the mixture 112 from side to side in the sump to maintain a uniform level of the mixture in the sump, thereby resulting in a uniform transfer of powder across the powder deposition width onto a substrate as will be explained subsequently.

The paddle wheel elevator 108 receives a portion of the mixture 112 from sump 104 by the action of cross mixer 106. The paddle wheel elevator 108 is rotated (drive not shown) such that paddles dip into the mixture 112, and capture samples of the mixture 112. The samples are conveyed to a metering zone proximate to the magnetic brush roll assembly 114, which is comprised of a rotatable magnetic core and an outer nonmagnetizable conductive shell that is generally maintained at a grounded electrical bias.

The rotatable magnetic core is offset (upwardly in FIG. 10) from the central axis of the nonmagnetizable conductive shell so that the developer mixture can be released to the cross mixing sump 104. Magnets on the rotatable magnetic core attract the developer mixture through the metering zone to the surface of the nonmagnetizable conductive shell and form bristles of mixture (not shown) in the proximity of each magnetic pole. Rotation of the magnetic core in the clockwise direction causes the developer mixture to tumble and transport in the counter-clockwise.

The magnetic bead particles used in the mixture 112 may be either insulating, semiconducting or conducting. Polymeric coatings may be applied to the core bead material to control the triboelectric charging properties of the coated beads when mixed with insulative powder. Examples of core bead materials include gamma ferric oxide, barium ferrite and strontium ferrite. In certain embodiments, the average diameter of the magnetic beads may be in the range of 10 to 200 micrometers (μm). In certain embodiments, the mixture of powder and magnetic carrier beads is comprised of at least about 60 weight percent of magnetic bead particles.

The toner powder used in electrophotographic printing systems typically is comprised of a thermoplastic such as copolymers of polystyrene, and polymethylmethacrylate, polyvinyl acetate, polyurethane, etc. Such polymers tend to be brittle and therefore not sufficiently tough to withstand engineering applications of 3D objects. Consequently, most applications for building polymeric 3D objects require the use of engineering polymers such as an acrylonitrile-butadiene-styrene (ABS) copolymer. Other engineering polymers include polycarbonate, blends of polycarbonate and acrylonitrile-butadiene-styrene, polyamides, polyphenylsulfone, polyetherimide, etc. Such polymers are compatible with the electrophotographic process in that the powder is insulating to facilitate triboelectric charging of the powder and enable the use of an electrostatic force to transfer the charged powder from one surface to another. Metallic powders can also be used provided that the surface of the conductive powder is coated with an insulative material such as an oxide layer and/or a polymeric material. Although the powder used in a two-component developer mixture is typically insulating, it can also be charge relaxable such that the powder tends to be insulating during the process of triboelectric charging in the magnetic brush system 100 and deposition of powder onto the substrate, but upon sufficient dwell time on the substrate and/or subjecting the powder to an ambient such as moisture, the charge on the deposited powder relaxes (dissipates). Examples of insulative and charge relaxable powders include various polymeric materials, mixtures of such materials with pigments or dyes, ceramic powders, polymeric coatings on metallic and ceramic powders, etc. Blends of such powders may also be used in the magnetic brush deposition system 100.

The powder that is triboelectric charged by mixing with carrier beads in a magnetic brush development system may include various additives such carbon black, titanium dioxide or colored dyes or pigments, internal triboelectric charge control additives, and surface flow agent such as fumed silica, metal stearates, fluoropolymer powder, etc. Although the properties of the powders used to build the 3D object are selected to provide the desired appearance and mechanical properties of the 3D object, the powder used for support during the layer-by-layer build process is viewed to be sacrificial and easily removable upon completion of the 3D object building. Examples of such powder materials include water dissolvable polymers and high melting point organic or inorganic materials that do not sinter when subjected to temperatures that sinter the 3D object powder.

When heat and/or pressure after each electrostatic transfer is used to consolidate the powders for the 3D object and support layer, the consolidation conditions and properties of the powders will dictate the type of 3D object and support that is formed. If there is complete melting of either or both of the 3D object and support powders, a solid material will be formed. On the other hand, the consolidation conditions and powder properties can be such that either or both of the 3D object and support powders are sintered. After the support material is removed, a solid 3D object can be formed by a separate infusion step with a lower melting material such as bronze.

Experimental Apparatus and Compositions

Figure 11:
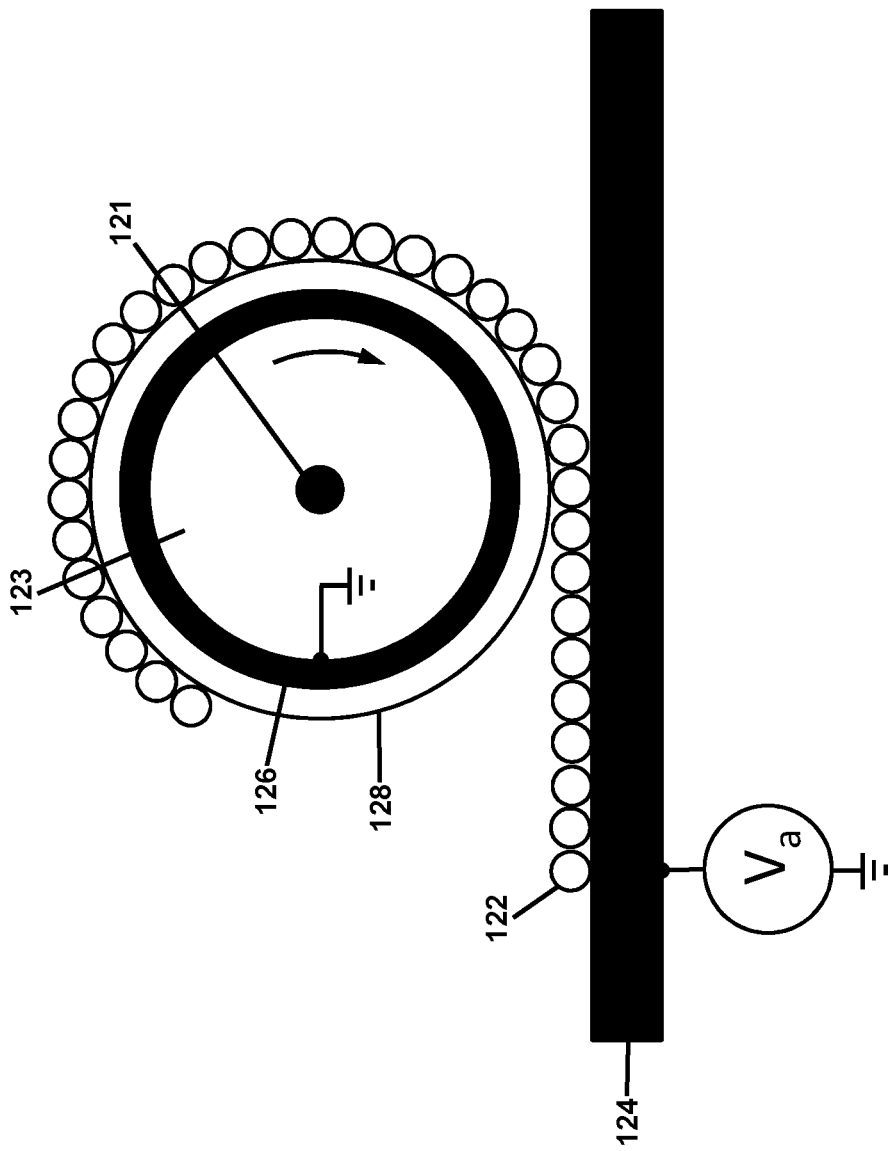
FIG. 11 is an illustration of an apparatus for performing direct electrostatic transfer of insulative charged powder to a conductive electrode.

In order to understand how electrostatic transfer of charged powder to a surface depends on the physical and electrical properties of the substrate material, a bench top apparatus has been assembled to simulate and study various electrostatic transfer conditions. FIG. 11 illustrates components of the apparatus for studying direct electrostatic transfer of insulative charged powder 122 to a conductive electrode 124 that can be electrically biased with a voltage of $V_a$. A conductive cylinder 123 of about 5 cm diameter and about 12 cm in length was provided having a conductive axle rod 121 extending beyond the cylinder ends so that the cylinder 123 could be electrically grounded and rotated much like a baking rolling pin. A 3 mm thick, compliant and conductive (carbon black loaded to obtain a sheet resistance of about 100 ohms/square) elastomer 126 was wrapped around the grounded conductive cylinder 123. The compliant elastomer 126 ensured close contact of the charged powder 122 with the conductive electrode receiver 124. To obtain a high transfer electric field without air breakdown, a charge relaxable, intermediate belt 128 with a thickness of 75 µm was wrapped around the conductive elastomer 126 as illustrated in FIG. 11. The sheet resistance of the belt 128 was about $10^{11}$ ohms/square.

To coat the surface of intermediate belt 128 with charged powder, the intermediate belt 128 was first offline coated with charged powder from a powder generating apparatus (not shown). The intermediate belt was positioned proximate to a toner cloud produced by the powder generating apparatus, causing the deposition of a charged powder layer onto the intermediate belt material 128 before it was wrapped around the cylinder 123 as shown in FIG. 11.

In the powder generating apparatus, a fine thermoplastic powder was mixed with permanently magnetized carrier beads to obtain a powder charge-to-mass ratio of about −20 µC/g. The intermediate belt 128 was attached to the underside of top electrode of the apparatus and a small quantity of the powder and carrier bead mixture was placed on the bottom electrode connected to an electrometer. With a bias of +1000 volts applied to the top electrode behind the adjacent intermediate belt material 128, the negatively charged powder deposited on the charge-relaxable intermediate belt 128 in an area corresponding to where rotation of permanent magnets contained in the apparatus tumbled the mixture. The deposited powder mass per unit area was in the range of 1 to 2 mg/cm$^2$. The powder-coated intermediate belt 128 was then removed from the upper electrode and wrapped around the conductive elastomer 126 illustrated in FIG. 11. When a bias of +1000 volts was applied to the conductive electrode 124 and the powder coated cylinder 123 was rapidly hand rolled over the electrode 124, essentially all of the powder 122 was electrostatically transferred to the conductive electrode substrate 124. It should be noted that in regions where there was no powder on the intermediate belt 128, the conductive electrode 124 directly contacted the intermediate belt 128. There was no shorting out (excessive electrical current) of the voltage supply since the resistivity of the intermediate belt material was sufficiently high to preclude this problem. In the powder covered regions, charge relaxation across the intermediate belt 128 increased the transfer electric field for efficient electrostatic transfer without air breakdown problems. To summarize, this simulation demonstrated that insulative charged powder on an intermediate belt material can be electrostatically transferred to a highly conductive substrate with high transfer efficiency.

Figure 12:
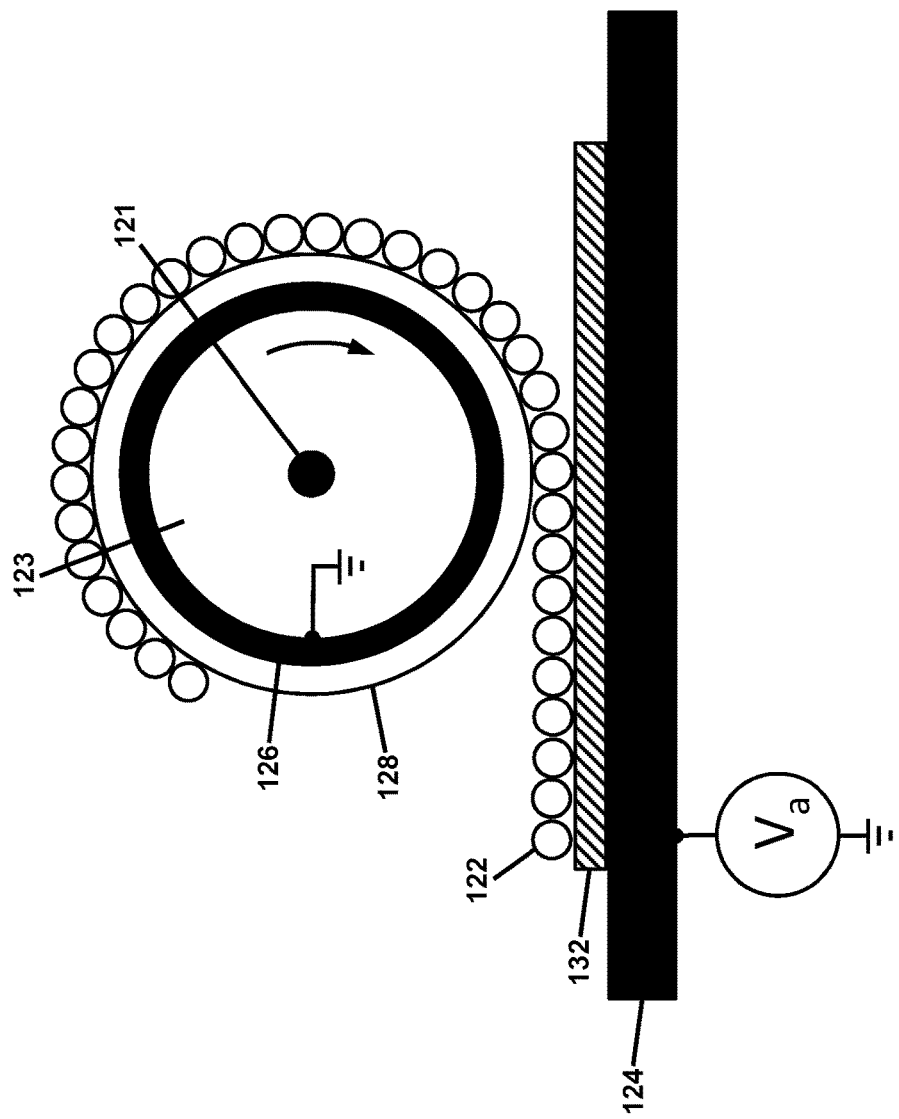
FIG. 12 is an illustration of an apparatus for performing direct electrostatic transfer of insulative charged powder to a thin dielectric covering a conductive substrate.

FIG. 12 illustrates a bench top apparatus similar to that illustrated in FIG. 11 except an insulative dielectric film 132 of 75 µm thickness was first overlaid on the conductive electrode 124. Under the same transfer conditions used for the apparatus illustrated in FIG. 11, the same high transfer efficiency was observed. Although the dielectric film 132 reduced the transfer electric field compared to the case of a bare electrode, the electric field was sufficient to provide efficient electrostatic transfer.

Figure 13:
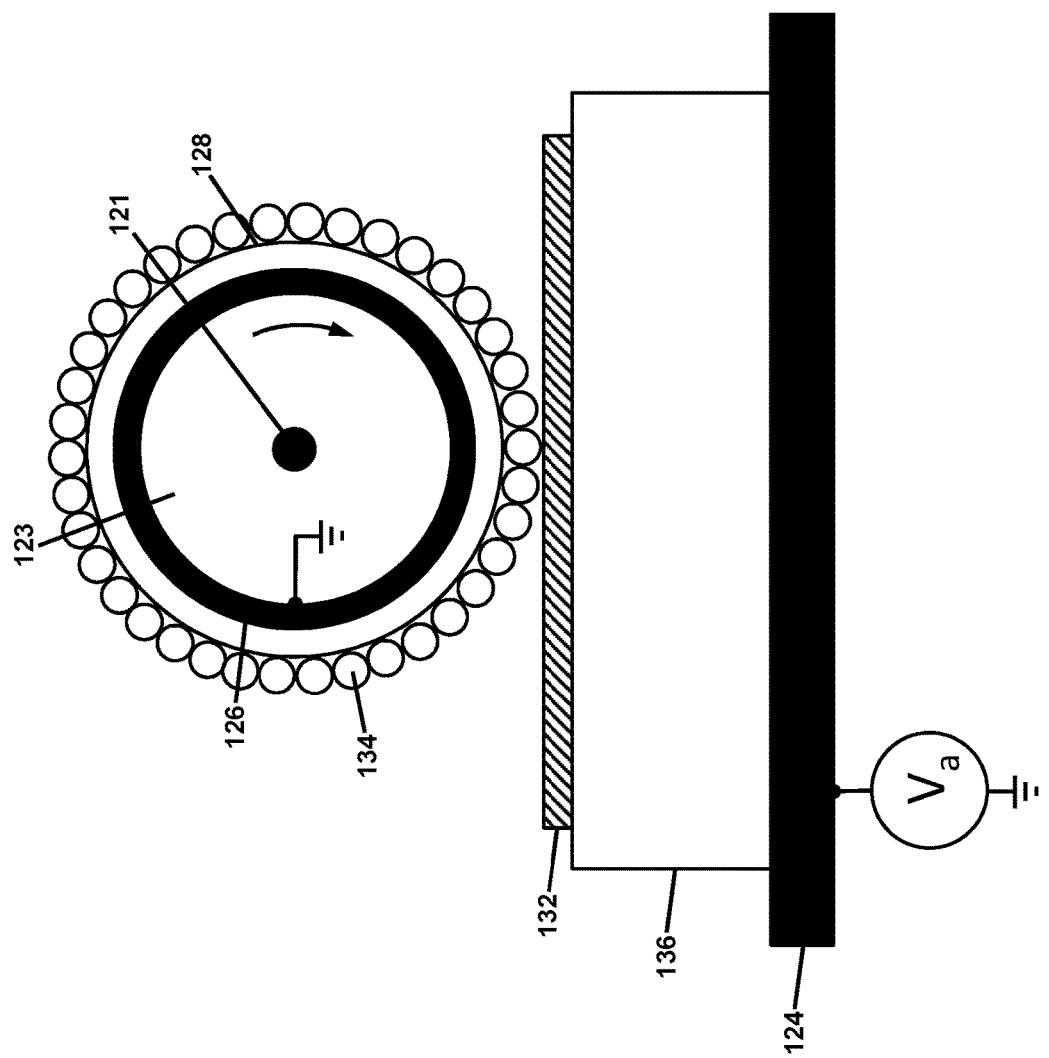
FIG. 13 is an illustration of an apparatus for performing direct electrostatic transfer of insulative charged powder to a thick dielectric covering a conductive substrate.

FIG. 13 illustrates a bench top configuration similar to that of FIG. 12 except that a much thicker dielectric 136 of 1.6 mm thickness was inserted between the thinner dielectric 132 and biased electrode 124. Under the same transfer conditions used for the apparatus illustrated in FIGS. 11 and 12, essentially no powder 134 was transferred. The transfer electric field was about 15 times weaker compared to the conditions of FIG. 12. The decrease in transfer efficiency as a function of increasing dielectric thickness between the substrate of the charged powder source and a biased electrode behind the dielectric demonstrates the problem in being able to build 3D objects with conventional electrostatic transfer methods as practiced in 2D electrophotography. Since there is no net charge on the dielectric spacers, these geometries simulate the situation where 3D objects are neutralized during the build process with conventional electrophotography methods. This demonstrates that even if the net charge of transferred powder is neutralized during the building of 3D objects, the transfer efficiency falls off with increasing dielectric thickness (reduced transfer electric field).

Figure 14:
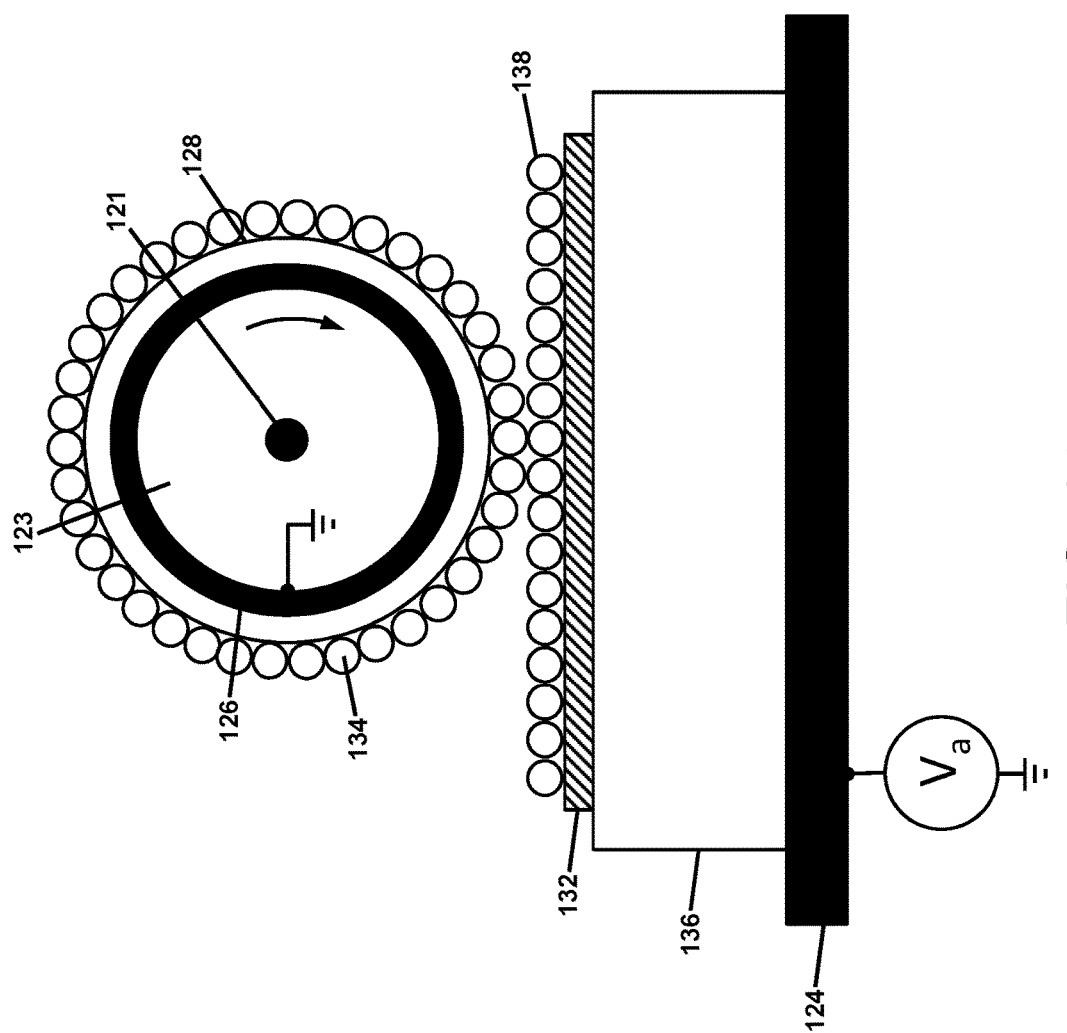
FIG. 14 is an illustration of an apparatus for performing direct electrostatic transfer of insulative charged powder to a charged powder layer on top of a thick dielectric covering on a conductive substrate.

The bench top apparatus illustrated in FIG. 14 is similar to that of FIG. 13 except the thin dielectric layer 132 is first overcoated with charged powder 138 deposited by the same apparatus used to deposit charged powder on the intermediate belt material 128 that is wrapped around the cylinder 123. In depositing charged powder 134 on a charge-relaxable intermediate belt material 128, the powder charge induces an oppositely charged countercharge in the surface of the intermediate belt 128 near the powder layer 134. When depositing charged powder 138 on an insulative dielectric such as dielectric 132 mounted near a conductive electrode in the powder deposition apparatus, the countercharge is at the surface of the adjacent conductive electrode.

Prior to performing experiments, the Applicants hypothesized that when the powder-coated layer 138 on the dielectric 132 is removed from the conductive electrode in the powder deposition apparatus, air breakdown would likely cause (nonuniform) transfer of a fraction of the countercharge from the apparatus electrode to the adjacent surface of the dielectric 132. In performing experiments with the apparatus of FIG. 14, the powder layer 138 was charged and a countercharge was on the backside of the dielectric sheet 132. Without wishing to be bound to any particular theory, the Applicants believe that the countercharge provided an electrostatic force that helped to adhere the charged powder 138 to the dielectric 132 when the charged powder 138 on the dielectric sheet 132 was placed on top on the thicker dielectric 136. When the cylinder 123 with the charged powder 134 was brought into rolling contact with the charged powder layer 138 while a bias of +1000 volts was applied to electrode 124, it was observed that there was no transfer of charged powder 134 to the charged powder layer 138. In spite of the applied electric field (albeit low) to transfer powder 134 to powder 138, it was observed that most of the charged powder 138 transferred to the charged powder layer 134. The Applicants believe that this is because the charge on the powder layer 138 induced a charge on the intermediate belt material 128 in the transfer zone, and that the induced charge caused an electrostatic attraction to the charged powder layer 134.

This bench top experiment demonstrates the additional difficulty in being able to electrostatically transfer charged powder to a 3D object that is accumulating net charge from superimposing a charged layer on top of another during the build process. As discussed previously herein, this is why attempts have been made to improve the 3D build thickness by neutralizing the transferred powder layer by layer. A possible limitation with this method is that even with neutralization of the 3D object during building, the increased thickness of the 3D object reduces the transfer electric field and therefore limits the final thickness of the object.

The bench top apparatus illustrated in FIG. 15 is similar to that of FIG. 14 in that the charged powder layers were prepared in the same manner. Just prior to the charged powder layer 122 on the cylinder 123 being rolled over the charged powder layer 138, the powder layer 138, the sides of thin dielectric 132 and thicker (1.6 mm) dielectric 136 and the electrode 124 were all lightly spray coated with layer 142 comprised of a mixture of SD alcohol 40-B, water, acrylates copolymer and other additives. In that manner, the temporarily conductive powder layer 138 on top of the thick dielectric 136 covered by the thin dielectric 132 was electrically connected to the conductive substrate electrode 124 by the application of the alcohol solution layer 142 on the top and sides of the thick dielectric 136. When the cylinder 123 with charged powder layer 122 was rapidly rolled over the powder layer 138 (now electrostatically discharged) with a +1000 volt bias applied to electrode 124, essentially all of the charged powder 122 was electrostatically transferred to the powder layer 138. This demonstrates the utility disclosed herein in applying a temporary (or permanent) conductive material to the surface and sides of a 3D object to enable electrostatic transfer of charged insulative powder to the 3D object, independent of the thickness.

It is, therefore, apparent that there has been provided, in accordance with the present invention, a method and apparatus for fabricating three-dimensional objects by charged powder deposition based on electrophotography. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

We claim:

1. A method of fabricating an object, the method comprising:
   a) depositing a first layer of first object material on a grounded support substrate electrode;
   b) applying an electrically conductive agent material onto the first layer of first object material on the grounded support substrate electrode such that the applied electrically conductive agent material is grounded;
   c) depositing a first layer of charged powder on an exterior surface of a charge-relaxable intermediate substrate;
   d) conveying the first layer of charged powder on the exterior surface of the charge-relaxable intermediate substrate proximate to the first layer of first object material on the grounded support substrate electrode; and
   e) applying a first voltage to a conductive transfer member located behind the charge-relaxable intermediate substrate to provide a first transferring electric field, thereby causing transfer of the first layer of charged powder from the charge-relaxable intermediate substrate onto the first layer of first object material on the grounded support substrate electrode, to form a first powder layer on the first layer of first object material on the grounded support substrate electrode.

2. The method of claim 1, further comprising fusing the first powder layer on the first layer of first object material on the grounded support substrate electrode to form a first fused layer on the first layer of first object material on the grounded support substrate electrode.

3. The method of claim 2, further comprising applying the electrically conductive agent material onto the first fused layer on the first layer of first object material on the grounded support substrate electrode; depositing a second layer of charged powder on the charge-relaxable intermediate substrate; conveying the second layer of charged powder on the charge-relaxable intermediate substrate proximate to the first fused layer; applying a second voltage to the conductive transfer member to provide a second transferring electric field, thereby causing transfer of the second layer of charged powder from the charge-relaxable intermediate substrate onto the first fused layer on the first layer of first object material on the grounded support substrate electrode to form a second powder layer on the first fused layer on the first layer of first object material on the grounded support substrate electrode, and fusing the second powder layer on the first fused layer on the first layer of first object material on the grounded support substrate electrode.

4. The method of claim 1, further comprising depositing a second layer of charged powder on the charge-relaxable intermediate substrate, conveying the second layer of charged powder on the charge-relaxable intermediate substrate proximate to the first powder layer on the first layer of first object material on the grounded support substrate electrode; applying a second voltage to the conductive transfer member to provide a second the transferring electric field, thereby causing transfer of the second layer of charged powder from the charge-relaxable intermediate substrate onto the first powder layer on the first layer of first object material on the grounded support substrate electrode.

5. The method of claim 4, further comprising fusing the first and second powder layers to form a first fused layer on the first layer of first object material on the grounded support substrate electrode.

6. The method of claim 4, wherein the object is comprised of N powder layers fused into a first fused layer, and the method further comprises:
  a) repeating N−2 times the steps of:
    depositing an additional layer of charged powder on the charge-relaxable intermediate substrate;
    conveying the additional layer of charged powder on the charge-relaxable intermediate substrate proximate to the preceding powder layer on the first layer of first object material on the grounded support substrate electrode; and
    applying a voltage to the conductive transfer member to provide a next transferring electric field, thereby causing transfer of the additional layer of charged powder from the charge-relaxable intermediate substrate onto the preceding powder layer on the first layer of first object material on the grounded support substrate electrode; and
  b) fusing the N powder layers fused into the first fused layer.

7. The method of claim 6, wherein the electrically conductive agent material is a liquid, and the method further comprises applying the electrically conductive agent material onto the N powder layers such that the applied electrically conductive agent material is grounded.

8. The method of claim 6, wherein the electrically conductive agent material is a solid, and the method further comprises fusing the N powder layers into the first fused layer, followed by applying the electrically conductive agent material onto the first fused layer such that the applied electrically conductive agent material is grounded.

9. The method of claim 6, wherein the electrically conductive agent material is a solid, and the method further comprises applying electrically conductive agent to a fuser roll, contacting the fuser roll with the N powder layers to transfer electrically conductive agent material, fuse the N powder layers into the first fused layer, and apply the electrically conductive agent material on the first fused layer such that the applied electrically conductive agent material is grounded.

10. The method of claim 4, wherein the electrically conductive agent is a liquid.

11. The method of claim 10, wherein the electrically conductive agent is a liquid polymer solution.

12. The method of claim 10, wherein the electrically conductive agent is a polar protic solvent selected from the group consisting of water, alcohols having a molecular weight of less than 61, and mixtures thereof.

13. The method of claim 12, wherein the electrically conductive agent is further comprised of a surfactant.

14. The method of claim 1, wherein the electrically conductive agent is a solid material.

15. The method of claim 14, wherein the electrically conductive agent is selected from the group consisting of a conductive polymer, carbon black, graphite, graphene, graphene nanoplatelets, carbon nanowires, carbon nanotubes, fluorine-doped tin oxide, and indium tin oxide, and mixtures thereof.

16. The method of claim 1, wherein the electrically conductive agent is temporarily present on the first layer of first object material on the grounded support substrate electrode.

17. The method of claim 1, wherein the first layer of first object material on the grounded support substrate electrode is formed by depositing a base layer of charged powder on the charge-relaxable intermediate substrate, conveying the base layer of charged powder on the charge-relaxable intermediate substrate proximate to the grounded support substrate electrode; applying a voltage to the conductive transfer member to provide a base electric field, thereby causing transfer of the base layer of charged powder from the charge-relaxable intermediate substrate onto the grounded support substrate electrode, and fusing the base layer on the grounded support substrate electrode to form the first layer of first object material on the grounded support substrate electrode.

18. The method of claim 1 wherein the first layer of first object material on the grounded support substrate electrode is removably adhered to the grounded support substrate electrode.

19. The method of claim 1, wherein the applied electrically conductive agent material is in electrical contact with the grounded support substrate electrode.

20. The method of claim 1, wherein the first layer of first object material on the grounded support substrate electrode is comprised of a top surface and a side wall, and the applying the grounded electrically conductive agent material onto the first layer of first object material on the grounded support substrate electrode is comprised of applying the electrically conductive agent material onto the top surface of the first layer of first object material on the grounded support substrate electrode, and onto at least a portion of the side wall of the first layer of first object material on the grounded support substrate electrode to cause the applied electrically conductive agent material on the top surface of the first layer of first object material on the grounded support substrate electrode to be in electrical contact with the grounded support substrate electrode.

21. The method of claim 1, wherein the conductive transfer member is a conductive roller, and wherein the method further comprises rotating the conductive roller to cause an external surface thereof to be in synchronous motion with the charge-relaxable intermediate substrate and with a support substrate surface of the grounded support substrate electrode, and to cause the transfer of the first layer of charged powder from the charge-relaxable intermediate substrate onto the first layer of first object material on the grounded support substrate electrode.

* * * * *